US012774004B2

(12) United States Patent
Noguchi et al.

(10) Patent No.: US 12,774,004 B2
(45) Date of Patent: Oct. 27, 2026

(54) CONTROL DEVICE, CONTROL METHOD, AND STORAGE MEDIUM

(71) Applicant: HONDA MOTOR CO., LTD., Tokyo (JP)

(72) Inventors: Jumpei Noguchi, Tokyo (JP); Gaku Shimamoto, Tokyo (JP); Ayumu Mitomo, Tokyo (JP); Yujiro Komiyama, Tokyo (JP); Akiyoshi Suda, Tokyo (JP); Chaoyang Wang, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 9 days.

(21) Appl. No.: 19/033,518

(22) Filed: Jan. 22, 2025

(65) Prior Publication Data

US 2025/0236305 A1 Jul. 24, 2025

(30) Foreign Application Priority Data

Jan. 24, 2024 (JP) ................................ 2024-009056

(51) Int. Cl.

*B60W 50/038* (2012.01)
*B60W 50/14* (2020.01)
*G06F 8/65* (2018.01)

(52) U.S. Cl.

CPC .......... *B60W 50/038* (2013.01); *B60W 50/14* (2013.01); *G06F 8/65* (2013.01); *B60W 2556/45* (2020.02)

(58) Field of Classification Search

CPC ............... B60W 50/038; B60W 50/14; B60W 2556/45; B60W 30/06; B60W 60/00; G06F 8/65

See application file for complete search history.

(56) References Cited

U.S. PATENT DOCUMENTS 7,091,857 B2 * 8/2006 Lanigan ................. G08B 25/14 340/5.2
10,319,233 B2 * 6/2019 Hayakawa ............. G08G 1/143
11,072,367 B2 * 7/2021 Ohtani ............... B62D 15/0285

(Continued)

FOREIGN PATENT DOCUMENTS

CN 113823113 A 12/2021
JP 2006-318293 A 11/2006

(Continued)

OTHER PUBLICATIONS

Sep. 24, 2025, Translation of Japanese Office Action issued for related JP Application No. 2024-009056.

*Primary Examiner* — Mussa A Shaawat

(74) *Attorney, Agent, or Firm* — Paratus Law Group, PLLC

(57) ABSTRACT

A control device for a moving object, includes: a control unit capable of performing stop control to stop the moving object at a target position when a user of the moving object is not present in the moving object; and a storage unit in which software for movement control of the moving object is stored. In a case where the stop control is performed in a state in which update for the software is available, the control unit determines an instruction terminal that issues an instruction to perform the stop control, and then performs a first notification notifying the user that update for the software is available.

17 Claims, 24 Drawing Sheets

(56) References Cited

U.S. PATENT DOCUMENTS

| | | | | |
|---|---|---|---|---|
| 11,433,881 | B2 * | 9/2022 | Tsujino | B60K 35/22 |
| 12,038,770 | B2 * | 7/2024 | Fujiwara | B60W 30/06 |
| 2015/0191122 | A1 | 7/2015 | Roy et al. | |
| 2016/0272244 | A1 * | 9/2016 | Imai | B62D 15/0285 |
| 2018/0208245 | A1 * | 7/2018 | Mizutani | B60W 30/06 |
| 2019/0202447 | A1 * | 7/2019 | Taniguchi | B60W 30/06 |
| 2019/0286118 | A1 * | 9/2019 | Bando | B62D 1/00 |
| 2019/0344828 | A1 * | 11/2019 | Omori | B62D 15/0285 |
| 2020/0041992 | A1 * | 2/2020 | Nagashima | G06F 3/04847 |
| 2020/0201320 | A1 * | 6/2020 | Yamaguchi | G05D 1/0011 |
| 2020/0218249 | A1 * | 7/2020 | Sannodo | B60W 30/06 |
| 2020/0226926 | A1 * | 7/2020 | Suzuki | G08G 1/143 |
| 2022/0116863 | A1 * | 4/2022 | Nakagawa | H04W 48/18 |
| 2023/0032451 | A1 * | 2/2023 | Ishikawa | G06F 8/65 |
| 2023/0033832 | A1 * | 2/2023 | Ishikawa | G06F 8/65 |
| 2023/0236592 | A1 | 7/2023 | Noguchi et al. | |
| 2025/0305840 | A1 * | 10/2025 | Hirata | B60W 50/14 |
| 2025/0306605 | A1 * | 10/2025 | Hirata | B60W 40/105 |

FOREIGN PATENT DOCUMENTS

| | | | |
|---|---|---|---|
| JP | 2015-129753 | A | 7/2015 |
| JP | 2023-015109 | A | 1/2023 |
| JP | 2023-019099 | A | 2/2023 |
| JP | 2023-107663 | A | 8/2023 |

* cited by examiner

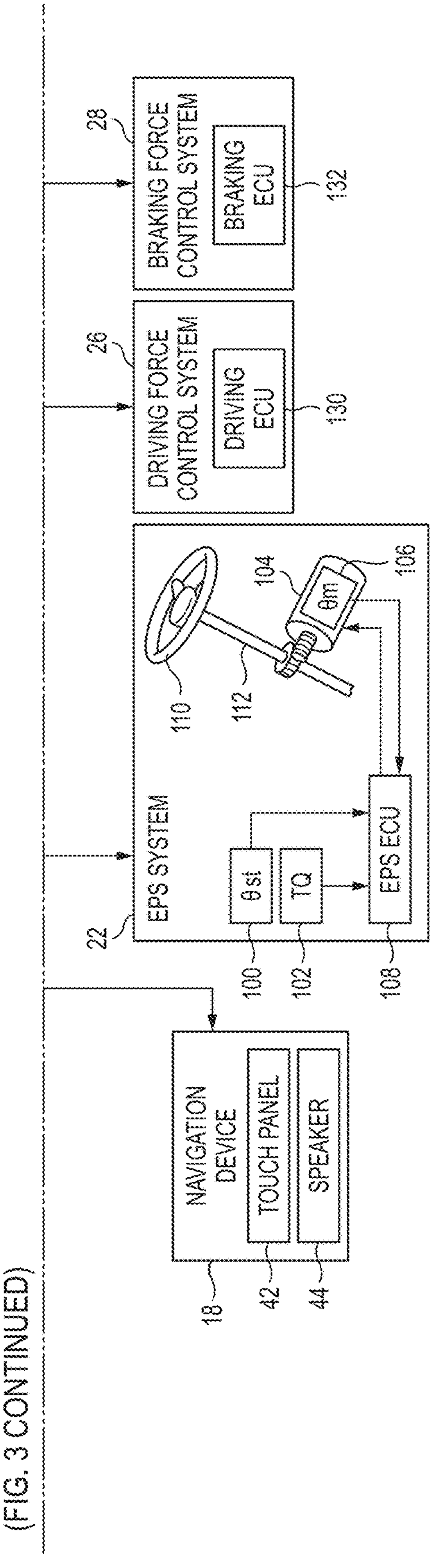
(FIG. 3 CONTINUED)

CONTROL DEVICE, CONTROL METHOD, AND STORAGE MEDIUM

This application is based upon and claims the benefit of priority from prior Japanese patent application No. 2024-9056, filed on Jan. 24, 2024, the entire contents of which are incorporated herein by reference.

TECHNICAL FIELD

The present disclosure relates to a control device, a control method, and a storage medium storing a control program.

BACKGROUND ART

In recent years, efforts have been made to provide access to a sustainable transportation system in consideration of people vulnerable among traffic participants.

In the related art, there is known a remote parking system that remotely operates a vehicle using a smartphone to park the vehicle in a designated predetermined parking space or to cause the vehicle to exit from a parking space. There is also known a method of updating software relating to remote parking by a user inputting a response to a data update suggestion displayed on a vehicle navigation device.

For example, CN113823113A describes an automated parking system that communicates with the cloud and notifies a vehicle owner if there is update information regarding automated parking, and when the owner selects to download the update information, an upgrade package is downloaded to a control unit of the vehicle to update information.

SUMMARY OF INVENTION

In the method in which the user updates software by inputting a response to a data update suggestion displayed on the navigation device inside the vehicle, when the user is remotely operating the remote parking of the vehicle outside the vehicle, the user is unable to input a response to the data update suggestion inside the vehicle, and therefore the software cannot be updated. It is also considered that a predetermined user may be notified when a remote parking instruction is received, but in that case, the genuine driver may not be notified. CN113823113A does not disclose how to update software during such remote parking.

Aspects of the present disclosure relate to providing a control device, a control method, and a storage medium storing a control program that are capable of appropriately notifying a user that update is available for software related to stop control of a moving object.

According to an aspect of the present disclosure, there is provided a control device for a moving object, the control device including:

- a control unit capable of performing stop control to stop the moving object at a target position when a user of the moving object is not present in the moving object; and
- a storage unit in which software for movement control of the moving object is stored, in which
- in a case where the stop control is performed in a state in which update for the software is available, the control unit determines an instruction terminal that issues an instruction to perform the stop control, and then performs a first notification notifying the user that update for the software is available.

According to another aspect of the present disclosure, there is provided a control method using a control device for a moving object, the control device including a control unit capable of performing stop control to stop the moving object at a target position when a user of the moving object is not present in the moving object, and a storage unit in which software for movement control of the moving object is stored, in which

- in a case where the stop control is performed in a state in which update for the software is available, a processor of the control device determines an instruction terminal that issues an instruction to perform the stop control, and then performs a first notification notifying the user that update for the software is available.

According to another aspect of the present disclosure, there is provided a non-transitory computer-readable storage medium storing a control program of a control device for a moving object, the control device including a control unit capable of performing stop control to stop the moving object at a target position when a user of the moving object is not present in the moving object, and a storage unit in which software for movement control of the moving object is stored, in which

- in a case where the stop control is performed in a state in which update for the software is available, the control program causes a processor of the control device to determine an instruction terminal that issues an instruction to perform the stop control, and then to perform a first notification notifying the user that update for the software is available.

According to aspects of the present disclosure, a control device, a control method, and a storage medium storing a control program that are capable of appropriately notifying a user that update is available for software related to stop control of a moving object may be provided.

BRIEF DESCRIPTION OF DRAWINGS

Exemplary embodiment(s) of the present invention will be described in detail based on the following figures, wherein.

DESCRIPTION OF EMBODIMENTS

Figure 1:
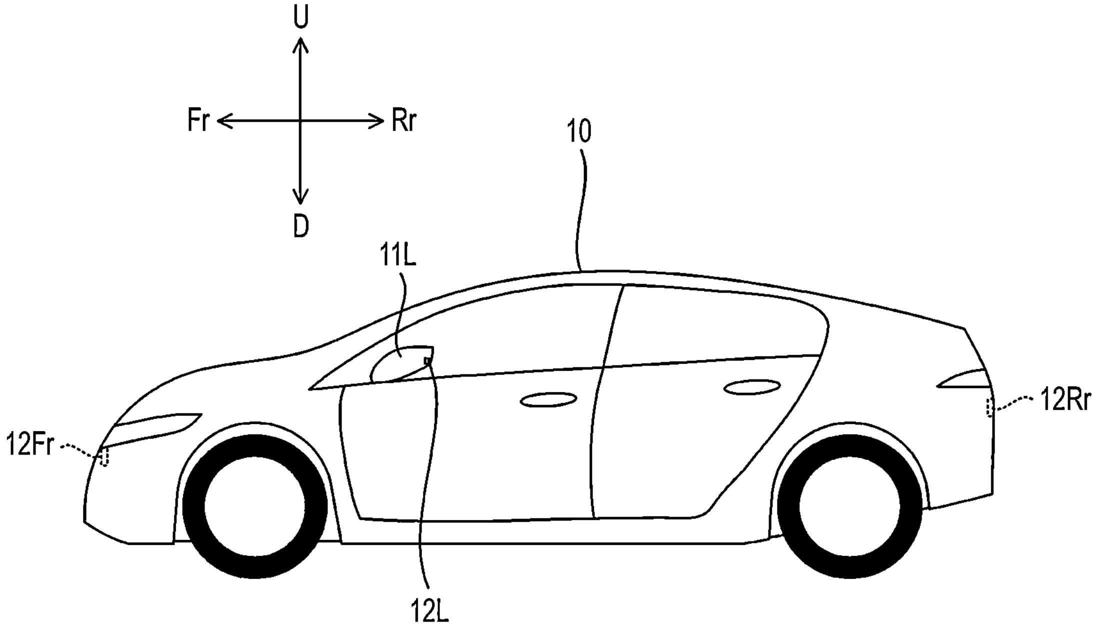
FIG. 1 is a side view of an example of a vehicle 10 equipped with a control device in the present disclosure.

Hereinafter, an embodiment of a control device, a control method, and a storage medium storing a control program according to the present disclosure will be described with reference to the accompanying drawings. Note that the drawings are viewed in directions of reference numerals. In order to simplify and clarify the description in the present specification or the like, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

Vehicle 10 Equipped with Control Device

Figure 2:
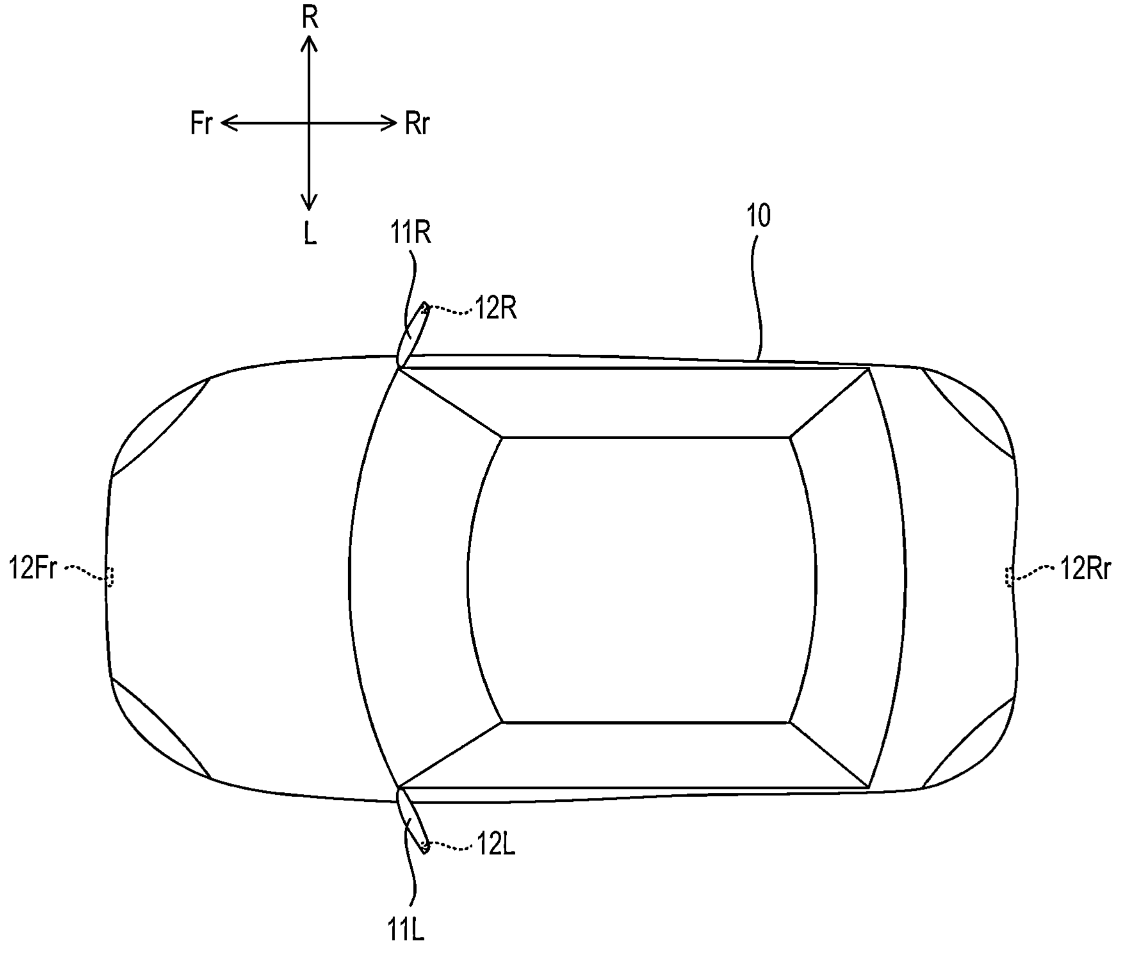
FIG. 2 is a top view of the vehicle 10 shown in FIG. 1.

FIG. 1 is a side view of an example of the vehicle 10 equipped with a control device of the present disclosure. FIG. 2 is a top view of the vehicle 10 shown in FIG. 1. The vehicle 10 is an example of a "moving object" in the present disclosure.

The vehicle 10 is an automobile including a drive source (not shown) and wheels including drive wheels driven by power of the drive source and steerable steered wheels. In the present embodiment, the vehicle 10 is a four-wheeled automobile having a pair of left and right front wheels and a pair of left and right rear wheels. The drive source of the vehicle 10 is, for example, an electric motor. Note that the drive source of the vehicle 10 may be an internal combustion engine such as a gasoline engine or a diesel engine, or a combination of an electric motor and an internal combustion engine. The drive source of the vehicle 10 may drive the pair of left and right front wheels, the pair of left and right rear wheels, or four wheels including the pair of left and right front wheels and the pair of left and right rear wheels. The front wheels and the rear wheels may all be steerable steered wheels, or the front wheels or the rear wheels may be steerable steered wheels.

The vehicle 10 further includes side mirrors 11L and 11R. The side mirrors 11L and 11R are mirrors (back mirrors) provided on outer sides of front seat doors of the vehicle 10 for the driver to check the rear side and rear lateral sides. The side mirrors 11L and 11R are fixed to a body of the vehicle 10 by rotation shafts extending in a vertical direction, and may be opened and closed by rotating about the rotation shafts.

The vehicle 10 further includes a front camera 12Fr, a rear camera 12Rr, a left side camera 12L, and a right side camera 12R. The front camera 12Fr is an imaging device (for example, a digital camera) that is provided on the front side of the vehicle 10 and captures an image in a forward direction of the vehicle 10. The rear camera 12Rr is a digital camera that is provided on the rear side of the vehicle 10 and captures an image in a rearward direction of the vehicle 10. The left side camera 12L is a digital camera that is provided on the left side mirror 11L of the vehicle 10 and captures an image in a leftward direction of the vehicle 10. The right side camera 12R is a digital camera that is provided on the right side mirror 11R of the vehicle 10 and captures an image in a rightward direction of the vehicle 10.

Internal Configuration of Vehicle 10

Figure 3:
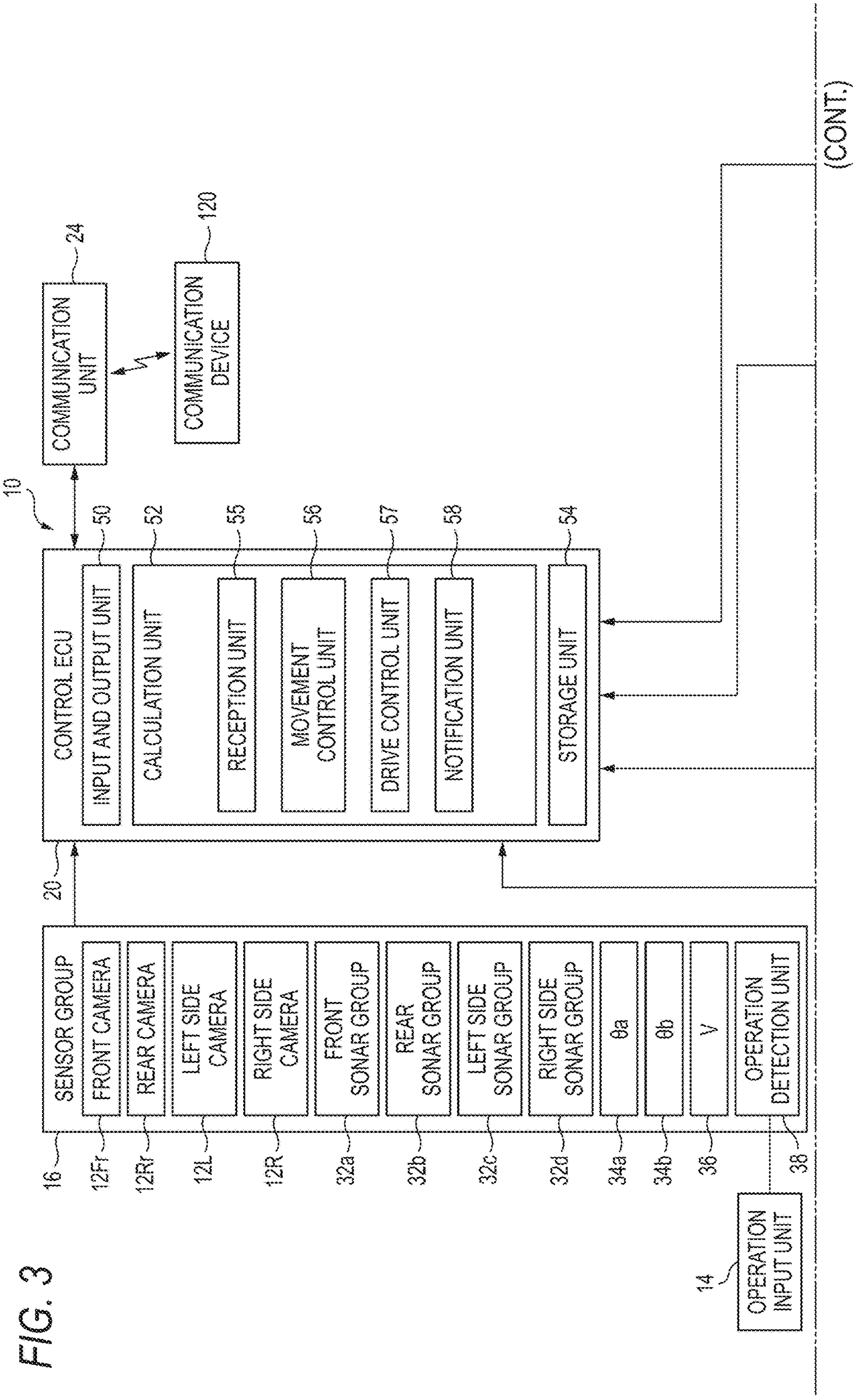
FIG. 3 is a block diagram showing an example of an internal configuration of the vehicle 10 shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control by the control ECU 20. The sensor group 16 includes the front camera 12Fr, the rear camera 12Rr, the left side camera 12L, and the right side camera 12R. The sensor group 16 also includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire external environment recognition data (for example, peripheral images) for recognizing an external environment of the vehicle 10 by capturing images of a periphery of the vehicle 10. The peripheral images of the vehicle 10 captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image. An image of the vehicle 10 and the periphery of the vehicle, which is generated by combining captured images from the front camera 12Fr, the rear camera 12Rr, the left side camera 12L, and the right side camera 12R, is referred to as a top view image of the vehicle 10.

The front sonar group 32*a*, the rear sonar group 32*b*, the left side sonar group 32*c*, and the right side sonar group 32*d* emit sound waves to the periphery of the vehicle 10, and receive reflected sounds from other objects. The front sonar group 32*a* includes, for example, four sonars. The sonars that constitute the front sonar group 32*a* are respectively provided on an obliquely left front side, a front left side, a front right side, and an obliquely right front side of the vehicle 10. The rear sonar group 32*b* includes, for example, four sonars. The sonars that constitute the rear sonar group 32*b* are respectively provided on an obliquely left rear side, a rear left side, a rear right side, and an obliquely right rear side of the vehicle 10. The left side sonar group 32*c* includes, for example, two sonars. The sonars that constitute the left side sonar group 32*c* are provided at a left side front portion and a left side rear portion of the vehicle 10, respectively. The right side sonar group 32*d* includes, for example, two sonars. The sonars that constitute the right side sonar group 32*d* are provided at a right side front portion and a right side rear portion of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by a predetermined angle. The detection pulses output from the wheel sensors 34*a* and 34*b* are used to calculate rotation angles and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects an operation content of a user performed using an operation input unit 14, and outputs the detected operation content to the control ECU 20. The operation input unit 14 includes various user interfaces such as a side mirror switch that switches between opened and closed states of the side mirrors 11L and 11R, and a shift lever (a selector lever or a selector).

The navigation device 18 detects a current position of the vehicle 10 by using, for example, a global positioning system (GPS), and guides the user along a route to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various types of guidance information to the user of the vehicle 10 by voice.

The touch panel 42 enables input of various commands to the control ECU 20. For example, the user may input a command related to movement assistance of the vehicle 10 via the touch panel 42. The movement assistance includes parking assistance and exiting assistance of the vehicle 10. The touch panel 42 displays various screens related to control contents of the control ECU 20. For example, the touch panel 42 displays a screen related to the movement assistance of the vehicle 10. Specifically, the touch panel 42 displays a parking assistance button for requesting parking assistance of the vehicle 10 and an exiting assistance button for requesting exiting assistance. The parking assistance button includes a remote parking button for requesting parking by automatic steering of the control ECU 20, and a support parking button for requesting support while parking the vehicle by an operation of the user. The exiting assistance button includes a remote exiting button for requesting exiting by the automatic steering of the control ECU 20, and a support exiting button for requesting support while exiting by an operation of the user. Note that a constituent element other than the touch panel 42, for example, an information terminal such as a smartphone or a tablet may be used as the input device or the display device.

The control ECU 20 includes an input and output unit 50, a calculation unit 52, and a storage unit 54. The calculation unit 52 is implemented by, for example, a central processing unit (CPU). The calculation unit 52 executes various types of control by controlling units based on a program stored in the storage unit 54. The calculation unit 52 receives and outputs signals from and to units connected to the control ECU 20 via the input and output unit 50. The control ECU 20 is an example of a "control device" in the present disclosure.

The calculation unit 52 includes a reception unit 55 that receives a movement control execution instruction from outside the vehicle 10 by a terminal of the user of the vehicle 10, a movement control unit 56 that performs movement control of the vehicle 10, a drive control unit 57 that drives the vehicle 10 and stops driving the vehicle 10, and a notification unit 58.

The reception unit 55 receives the movement control execution instruction from outside the vehicle 10 by communicating with the terminal of the user of the vehicle 10 via the communication unit 24, for example.

The movement control unit 56 performs remote parking assistance and remote exiting assistance of the vehicle 10 through automatic steering in which a steering 110 is automatically operated under control of the movement control unit 56. In the remote parking assistance and the remote exiting assistance, an accelerator pedal (not shown), a brake pedal (not shown), and the operation input unit 14 are automatically operated. The movement control unit 57 performs support parking assistance and support exiting assistance when the user (driver) operates the accelerator pedal, the brake pedal, and the operation input unit 14 to perform manual parking and manual exiting of the vehicle 10. Note that during the remote parking assistance and the remote exiting assistance, the user may be in a state of being present in the vehicle 10, or may be in a state of getting off the vehicle 10 and being outside (not being present in the vehicle).

For example, the movement control unit 56 performs the movement control for executing movement of the vehicle 10 based on the recognition data of the external environment of the vehicle 10 acquired by the front camera 12Fr, the rear camera 12Rr, the left side camera 12L, and the right side camera 12R, and a predetermined parking space specified by the user. The movement control includes parking control for remotely parking the vehicle 10 in a predetermined parking space (target parking position) and exiting control for remotely causing the vehicle 10 to exit from the predetermined parking space to a target position (target movement position). The movement control unit 56 may execute the parking control and the exiting control according to an instruction signal input from outside via the input and output unit 50. The input from the outside includes input by wireless communication from an information terminal or the like that may be carried by the user of the vehicle 10. The movement control unit 56 may transmit information related to the parking control and the exiting control to the external information terminal via the input and output unit 50.

Specifically, when receiving an operation for shifting to remote parking control or remote exiting control from the user of the vehicle 10, the movement control unit 56 transmits inquiry information necessary for determining a driver who performs an instruction operation for remote parking or remote exiting to information terminals in a vicinity of the vehicle 10. Among the information terminals in the vicinity of the vehicle 10, the movement control unit 56 transmits the inquiry information to an information terminal on which an application for performing a movement control execution instruction for the vehicle 10 is activated by a user operation. The movement control unit 56 determines a driver terminal that instructs to execute the movement control of the vehicle 10 based on a predetermined operation on the information terminal owned by the user. The movement control unit 56 receives predetermined response information from the user in response to the inquiry information of the movement control unit 56, and determines the information terminal that sends the response information that is first received as the driver terminal. The movement control unit 56 executes movement control of the vehicle 10 based on movement instruction information, which is the movement control execution instruction, from the driver terminal. The predetermined response information is, for example, information on an agreement response to a disclaimer. The driver terminal is an example of an "instruction terminal" in the present disclosure.

The movement control unit 56 registers a predetermined parking space designated by the user in the storage unit 54 as a designated parking space. The movement control unit 56 registers features related to the designated parking space in the storage unit 54 based on the recognition data of the external environment of the vehicle 10 acquired by the front camera 12Fr, the rear camera 12Rr, the left side camera 12L, and the right side camera 12R. The movement control unit 56 performs the remote parking control for parking the vehicle 10 in the designated parking space and the remote exiting control for causing the vehicle to exit from the designated parking space based on the recognition data of the external environment of the vehicle 10 and the features of the designated parking space designated by the user.

The drive control unit 57 drives the vehicle 10 (for example, turns on an ignition) and stops driving the vehicle 10 (for example, turns off the ignition) according to a user operation (for example, pressing of an ignition button). The drive control unit 57 may set an automatic stop mode in which driving of the vehicle 10 is automatically stopped based on completion of movement control (for example, the above-described remote parking).

The notification unit 58 gives various notifications to the user of the vehicle 10 by communicating with the information terminal of the user of the vehicle 10 via the communication unit 24, for example. The notification unit 58 gives various notifications to the user of the vehicle 10 by controlling the touch panel 42 and the speaker 44 of the navigation device 18, for example.

Specifically, when the stop control is executed to stop the vehicle 10 at a target position in a state in which update is available for the software for the movement control (parking control, exiting control) of the vehicle 10, the notification unit 58 determines the driver terminal that instructs to perform the stop control, and then performs a first notification notifying the user that update is available for the software. Similarly, when stop control is executed in a state in which update is available for the software, the notification unit 58 may perform the first notification after the driver terminal is determined and before the stop control is started. "After the driver terminal is determined" refers to, for example, after an agreement is reached on a disclaimer. The stop control refers to remote parking, and in the present embodiment, remote parking refers to remotely parking a vehicle. The state in which update is available for the software refers to, for example, that a newer version of the software than the software currently installed in the vehicle 10 is available on a server and may be downloaded. The state in which update is available for the software may also refer to that a new software has already been downloaded to the storage unit 54 of the vehicle 10 but update has not yet been performed. The update means to use the software to make the vehicle 10 capable of movement control.

The first notification by the notification unit 58 is, for example, a notification notifying that update is available for the software when the stop control for stopping the vehicle 10 at a target position is suspended and the vehicle 10 is powered off. Powering off means that an ignition is turned off. The movement control unit 56 receives an instruction from the information terminal (driver terminal) of the user as to whether to perform software update in response to the first notification, and if the instruction is an instruction to perform the software update, that is, to suspend the stop control of the vehicle 10 and power off the vehicle 10, the movement control unit 56 executes the software update.

The first notification by the notification unit 58 may be a notification notifying that update is available for the software, when a response is made to a second notification that is given when the stop control for stopping the vehicle 10 at a target position is completed and the vehicle 10 is powered off. The second notification is a notification notifying that an instruction as to whether to perform software update is to be received. When the movement control unit 56 receives an instruction to update the software in response to the second notification, the movement control unit 56 executes the software update.

When no instruction to update the software is received for a predetermined period after the notification notifying that an instruction to update the software is to be received is performed, the movement control unit 56 executes the software update. The predetermined period may be actual time (for example, 10 minutes or a period corresponding to a predetermined number of notifications) or may be an accumulated time of a driving cycle. The movement control unit 56 updates the software even when there is no instruction to update the software, for example, when there is no instruction to update for 10 minutes after the notification notifying that a software update instruction is to be received. Note that the movement control unit 56 does not receive any instructions of movement control of the vehicle 10 from the user during a period in which the software is being updated.

When the exiting control for moving the vehicle 10 from the stop position to a target position is executed in a state in which update is available for the software, the movement control unit 56 does not execute the software update even when the exiting control is completed and the vehicle 10 is powered off. The stop position refers to the parking position of the vehicle 10.

Even under the case where the exiting control for moving the vehicle 10 from the stop position to a target position is performed in the state in which update is available for the software, when the target position of the vehicle 10 is a predetermined position, the notification unit 58 performs a third notification notifying that update is available for the software when the exiting control is completed and the vehicle 10 is powered off. When the movement control unit 56 receives an instruction to update the software in response to the third notification, the movement control unit 56 executes the software update. The predetermined position may be, for example, a charging position at home for charging the vehicle 10, a position of a charging station provided near the parking position where the vehicle 10 is parked, or a car wash position at home for washing the vehicle 10. That is, the predetermined position is a position to which the vehicle 10 is moved for charging, and is a position to which the vehicle 10 is not expected to start traveling after the movement.

when an instruction of exiting control of the vehicle 10 is given from the information terminal owned by the user during update of the software, the notification unit 58 performs a fourth notification notifying that exiting control of the vehicle 10 is impossible. In this case, the movement control unit 56 will not perform the exiting control of the vehicle 10 until the software update is completed.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby providing support for an operation of an occupant on the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. Another communication device 120 includes a base station, a communication device of another vehicle, an information terminal such as a smartphone or a tablet that is portable for the user of the vehicle 10, and the like. For example, the communication unit 24 includes an ultra wide band (UWB, registered trademark) interface or the like that may execute UWB communication with the information terminal.

The driving force control system 26 includes a drive ECU 130. The driving force control system 26 executes driving force control of the vehicle 10. The drive ECU 130 controls a driving force of the vehicle 10 by controlling an engine (not shown) or the like based on an operation performed by the user on the accelerator pedal (not shown).

The braking force control system 28 includes a brake ECU 132. The braking force control system 28 executes braking force control of the vehicle 10. The brake ECU 132 controls a braking force of the vehicle 10 by controlling a brake mechanism or the like (not shown) based on an operation performed by the user on the brake pedal (not shown).

Fod System Including Control Device

Figure 4:
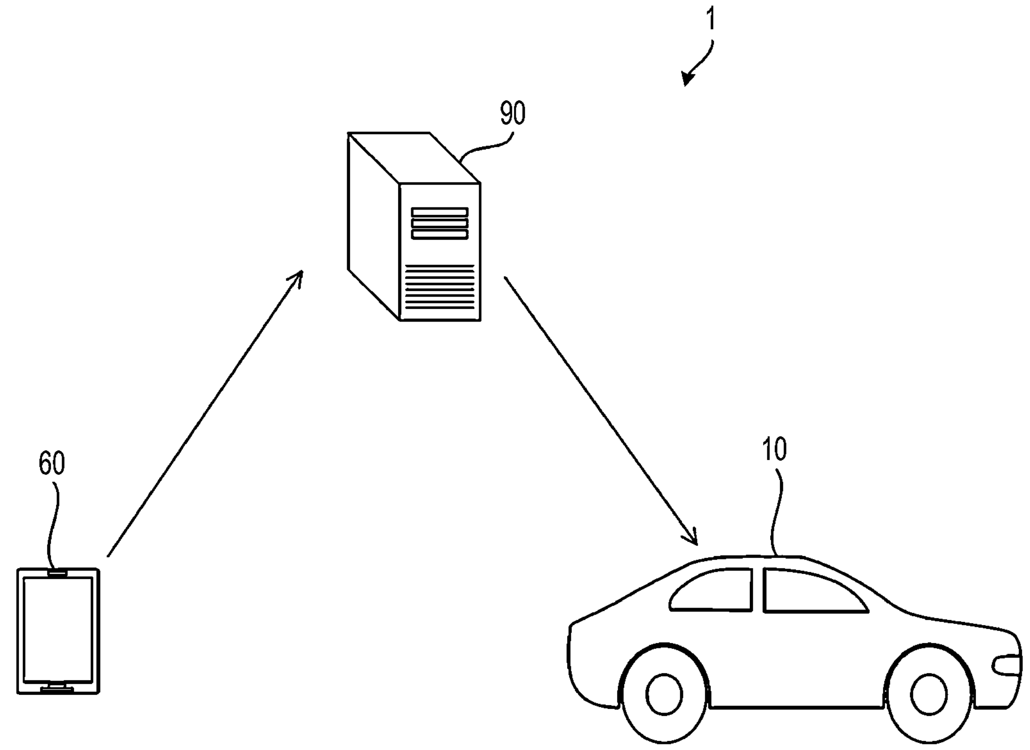
FIG. 4 is a diagram showing an example of a configuration of a Function on Demand (FoD) system 1 including a control device of the present embodiment.

FIG. 4 is a diagram showing an example of a configuration of a Function on Demand (FoD) system 1 including a control device of the present embodiment. As shown in FIG. 4, the FoD system 1 includes a server 90, and the vehicle 10 and an information terminal 60 which may communicate with the server 90. Although one vehicle 10 is shown in the present embodiment, the number of vehicles may be plural.

The server 90 is an external server installed in a facility such as a management center. The server 90 manages authority information related to an execution authority of the vehicle acquired when a certain user uses the vehicle 10, in association with the user (user ID). The software for the movement control of the vehicle 10 described above is managed by this server 90. Use of this software is one kind of authority information related to the execution authority of the vehicle 10. The user may download updated software from this server 90.

The server 90 controls to enable/disable (ON/OFF) a function of the vehicle 10 when the user uses the vehicle 10. Specifically, the server 90 performs control for switching enabling/disabling of a function of the vehicle 10 by transmitting, to the vehicle 10, a function ON signal for enabling the function or a function OFF signal for disabling the function.

The information terminal 60 is, for example, a smartphone or a tablet owned by the user. After purchasing the vehicle 10, for example, the user uses the information terminal 60 to purchase an execution authority related to a predetermined function of the vehicle 10 online. The user may use the purchased function in the vehicle 10 by transmitting an execution authority ID acquired by the purchase from the information terminal 60 to the server 90.

The vehicle 10 is a vehicle capable of performing so-called automated driving or assistance driving. The vehicle 10 may be a vehicle whose user is limited, such as a vehicle owned by an individual, or a vehicle whose user is not limited, such as a vehicle owned by a corporation. Those who may use a vehicle owned by an individual include, for example, the owner of the vehicle, his or her family, relatives, friends, and the like. The vehicle owned by a corporation includes a vehicle available to an unspecified number of users under a predetermined contract, such as a rental car or a shared car.

Figure 5:
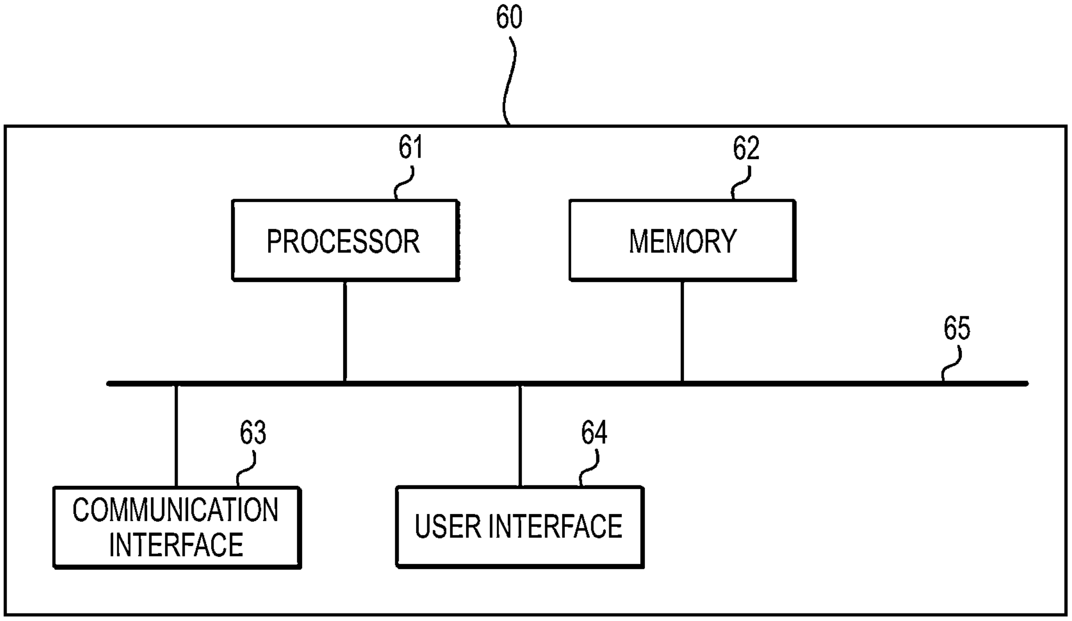
FIG. 5 is a diagram showing an example of a hardware configuration of an information terminal 60 owned by a user of the vehicle 10.

Hardware Configuration of Information Terminal 60 of User FIG. 5 is a diagram showing an example of a hardware configuration of the information terminal 60 owned by the user of the vehicle 10. The information terminal 60 includes a processor 61, a memory 62, a communication interface 63, and a user interface 64. The processor 61, the memory 62, the communication interface 63, and the user interface 64 are connected by, for example, a bus 65.

The processor 61 is a circuit that executes signal processing, and is, for example, a central processing unit (CPU) that controls the entire information terminal 60. Note that the processor 61 may be implemented by another digital circuit such as a field programmable gate array (FPGA) or a digital signal processor (DSP). The processor 61 may also be implemented by combining a plurality of digital circuits.

The memory 62 includes, for example, a main memory and an auxiliary memory. The main memory is, for example, a random access memory (RAM). The main memory is used as a work area of the processor 61.

The auxiliary memory is a non-volatile memory such as a magnetic disk, an optical disk, or a flash memory. The auxiliary memory stores various programs for operating the information terminal 60. The programs stored in the auxiliary memory are loaded into the main memory and executed by the processor 61.

The auxiliary memory may include a portable memory removable from the information terminal 60. Examples of the portable memory include a universal serial bus (USB) flash drive, a memory card such as a secure digital (SD) memory card, and an external hard disk drive.

The communication interface 63 is a communication interface that executes wireless communication with the outside of the information terminal 60 (for example, the communication unit 24 of the vehicle 10). For example, the communication interface 63 includes a UWB interface for executing UWB communication with the vehicle 10. The communication interface 63 is controlled by the processor 61.

The user interface 64 includes, for example, an input device that receives an operation input from the user and an output device that outputs information to the user. The input device may be implemented by, for example, a touch panel. The output device may be implemented by, for example, a display or a speaker. The user interface 64 is controlled by the processor 61.

The processor 61 executes movement control for instructing movement of the vehicle 10. For example, the processor 61 performs the movement control (including the parking control and the exiting control) on the vehicle 10 based on a specific operation of the user on a terminal screen of the information terminal 60. The specific operation includes, for example, a tap operation for reserving a plan for parking and exiting of the vehicle 10, and a slide operation for moving the vehicle 10. The slide operation includes a continuous position instruction operation (for example, swiping operation), a rotation instruction operation in a predetermined rotation direction (for example, rotation swiping operation), and the like. The processor 61 further executes control to generate a guidance image for prompting the user to perform an instruction operation on the terminal screen of the information terminal 60 and display the generated guidance image on the terminal screen.

The processor 61 transmits, to the vehicle 10, a parking instruction for remotely parking the vehicle 10 and an exiting instruction for remotely causing the vehicle 10 to exit based on a specific operation on the terminal screen of the information terminal 60. An application configured to perform movement control on the vehicle 10 by transmitting and receiving information related to the movement control of the vehicle 10 to and from the vehicle 10 is installed in the information terminal 60.

Control by Information Terminal 60

Figure 6:
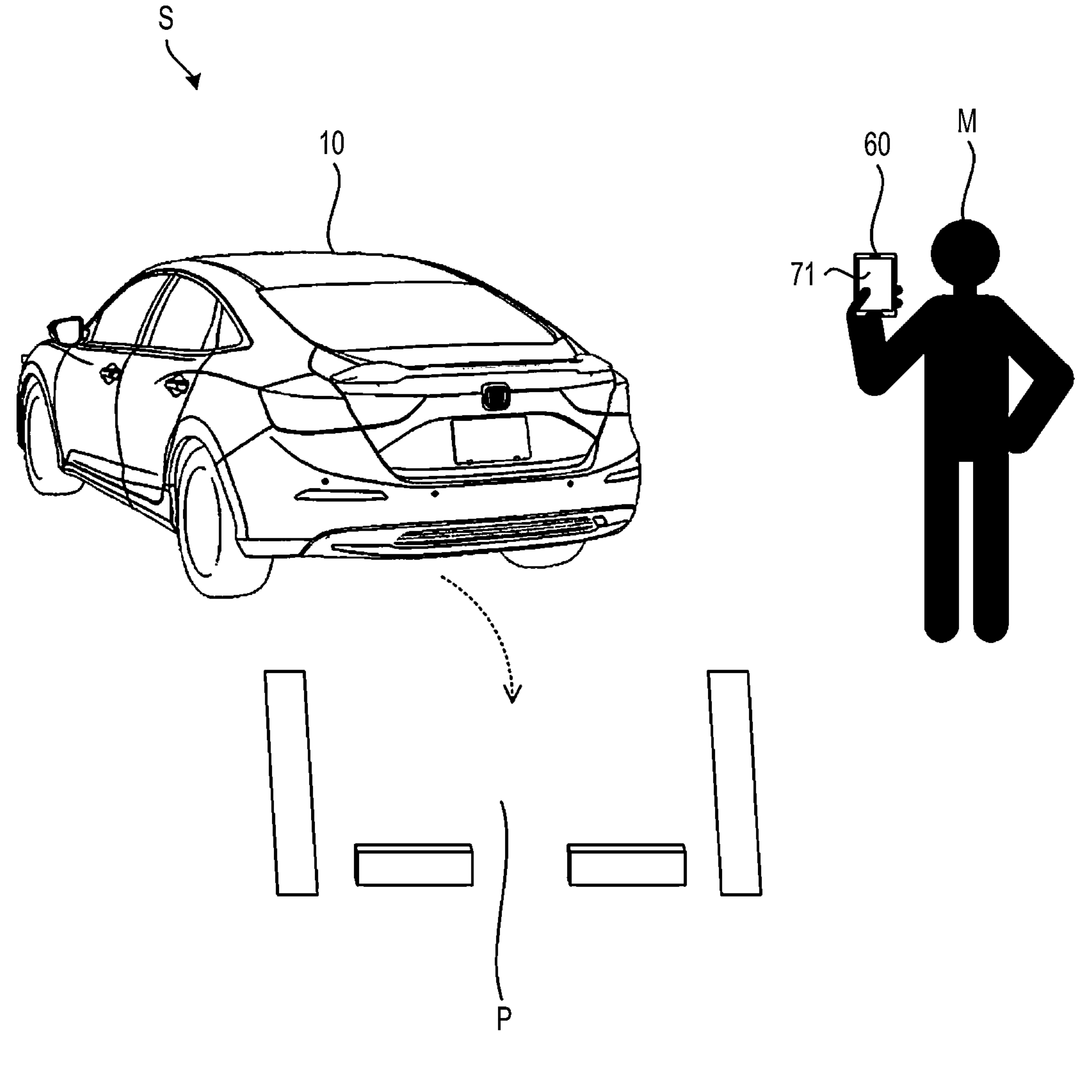
FIG. 6 is a diagram showing an example of movement control of the vehicle 10 from outside the vehicle 10 using an information terminal 60.

FIG. 6 is a diagram showing an example of the movement control of the vehicle 10 from outside the vehicle 10 using the information terminal 60. A user M of the vehicle 10 gives a movement control execution instruction to remotely park the vehicle 10 in a parking space P using the information terminal 60 carried by the user M from outside the vehicle 10. The movement control execution instruction includes, for example, a parking instruction to remotely park the vehicle 10 in the parking space P, and an exiting instruction to remotely cause the vehicle 10 to exit from the parking space P. The example shown in FIG. 6 shows a state in which a parking instruction is given to the vehicle 10.

When the user M performs a specific operation on a terminal screen 71 of the information terminal 60, the information terminal 60 transmits an instruction signal instructing the remote parking of the vehicle 10 to the vehicle 10 by wireless communication. Examples of the wireless communication with the vehicle 10 include, in addition to UWB communication, Bluetooth low energy (BLE: registered trademark), and near field communication (NFC: registered trademark). The vehicle 10 receives the instruction signal transmitted from the information terminal 60 through the communication unit 24. The movement control unit 56 of the vehicle 10 performs remote parking control of the vehicle 10 according to the received instruction signal.

First Operation Example

Figure 7:
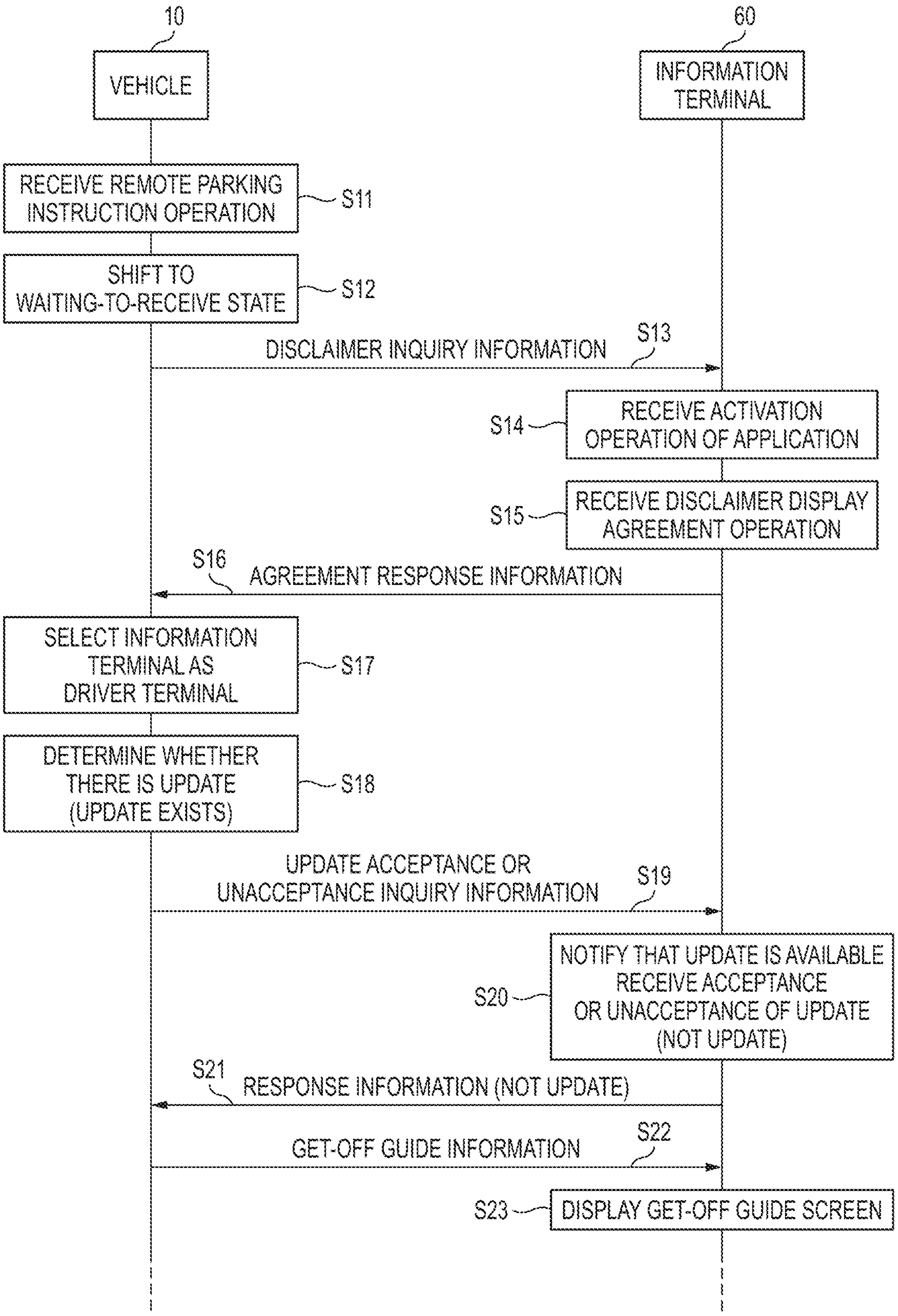
FIG. 7 is a sequence diagram (part 1) showing a first operation example of the vehicle 10 and the information terminal 60.
Figure 8:
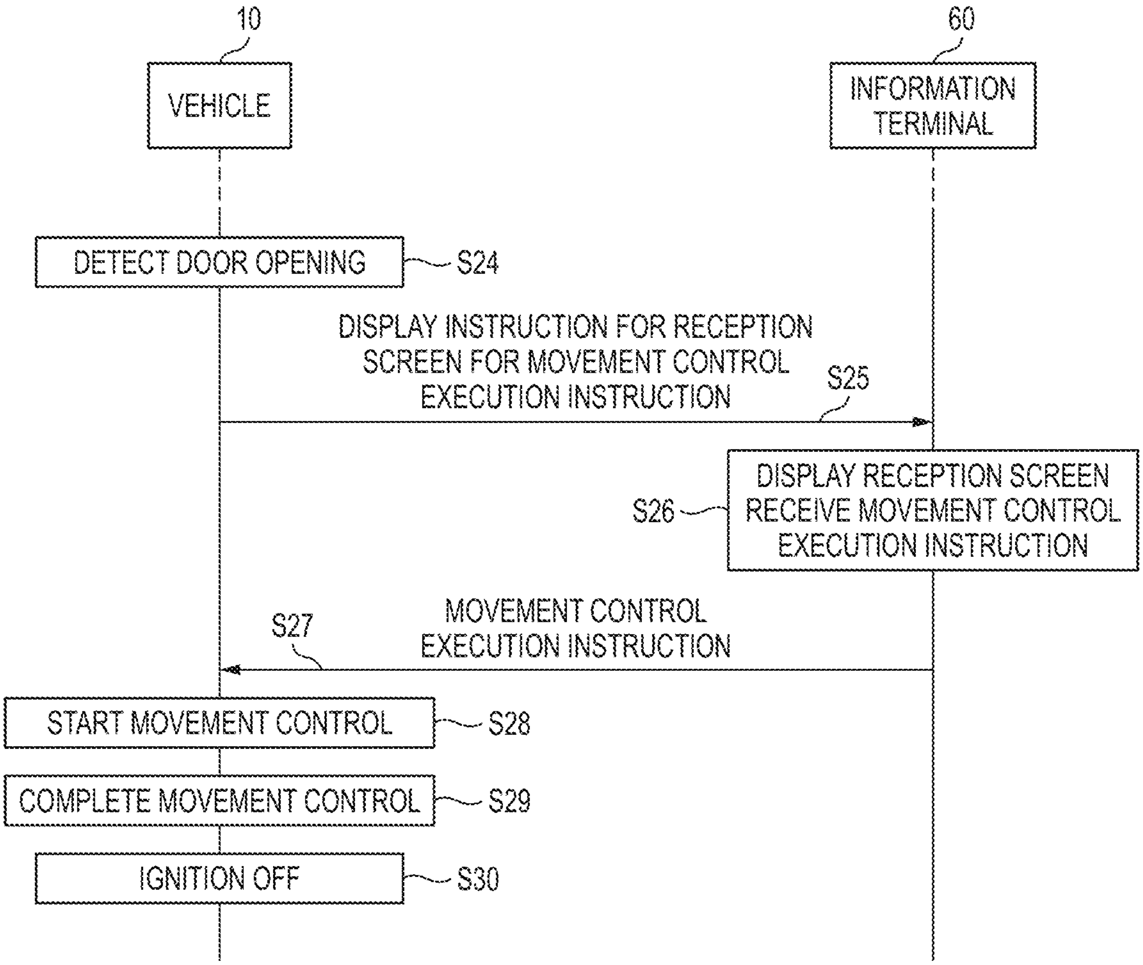
FIG. 8 is a sequence diagram (part 2) showing the first operation example of the vehicle 10 and the information terminal 60.

FIGS. 7 and 8 are sequence diagrams showing a first operation example of the vehicle 10 and the information terminal 60. Note that each operation of the vehicle 10 is executed under the control of the control ECU 20.

First, in FIG. 7, the vehicle 10 receives, from the user M, an instruction operation for remote parking to park the vehicle 10 in the parking space P under the remote parking control (step S11). The instruction operation for remote parking is an operation for setting the vehicle 10 to a state in which it can be parked by remote parking control. The instruction operation is received by touching a remote parking button (not shown) by the user M in the vehicle 10. The remote parking button may be, for example, a touch button displayed on the touch panel 42 of the navigation device 18, or a mechanical vehicle switch.

Next, the vehicle 10 shifts to a waiting-to-receive state to receive an instruction signal from the information terminal 60 (step S12). The vehicle 10 transmits inquiry information related to the remote parking disclaimer to an information terminal in the vicinity of the vehicle 10 (for example, the information terminal 60 carried by the user M) (step S13). The information terminal 60 in the vicinity of the vehicle 10 is, for example, an information terminal whose communication quality with the communication unit 24 of the vehicle 10 is equal to or higher than a certain level. Specifically, the information terminal 60 is a smartphone or the like carried by the user M within 5 m to 10 m of the vehicle 10. The inquiry information related to the disclaimer is, for example, information for inquiring of the user M whether to agree with cautions stipulated regarding remote parking.

The information terminal 60 receives an activation operation from the user M who activates an application for executing a movement control execution instruction for the vehicle 10 (step S14). The information terminal 60 displays the disclaimer (cautions stipulated regarding remote parking) on the terminal screen 71, and receives an agreement operation from the user M who agrees to the disclaimer (step S15). Examples of a screen of the disclaimer include a disclaimer screen 72, which will be described later with reference to FIG. 9.

Next, the information terminal 60 transmits agreement response information based on the operation of the user M, which is received in step S15, to the vehicle 10 (step S16). The agreement response information is, for example, information on a response of agreeing with the cautions regarding the inquired remote parking.

Next, the vehicle 10 selects the information terminal that sends the agreement response information first, that is, the information terminal 60 in this example, as the driver terminal (step S17). The driver terminal is an information terminal that is permitted to control remote parking of the vehicle 10. Accordingly, the information terminal 60 is in a state of being communicably connected to the vehicle 10 as a driver terminal that may issue an instruction of the remote parking of the vehicle 10.

Next, the vehicle 10 determines whether there is software to be updated (step S18). The presence of software to be updated means that new software is present in the server 90 and is ready for download, or that new software has been downloaded to the vehicle 10 but has not yet been updated. Here, description will be given on an assumption that there is software to be updated. The vehicle 10 transmits to the information terminal 60 update acceptance or unacceptance inquiry information inquiring whether to update the software (step S19).

Next, the information terminal 60 notifies the user M of the matter that update is available for the software by displaying on the terminal screen 71, and receives a response of acceptance or unacceptance of the update with respect to the notification from the user M (step S20). Here, description will be given on an assumption that the user M continues remote parking without updating the software. Examples of the screen for receiving the response of acceptance or unacceptance of the update include an update acceptance or unacceptance reception screen 73, which will be described later with reference to FIG. 10.

Next, the information terminal 60 transmits to the vehicle 10 update unacceptance response information of the user M who does not want to update the software, which is received in step S20 (step S21).

Next, the vehicle 10 that receives the update unacceptance response information from the information terminal 60 transmits to the information terminal 60 get-off guide information for prompting the user M to get off (step S22).

Next, the information terminal 60 displays a get-off guide screen for prompting the user M of the information terminal 60 to get off on the terminal screen 71 (step S23). The user M of the information terminal 60 opens a door of the vehicle 10, gets off, and closes the door of the vehicle 10 according to the get-off guide screen. Examples of the get-off guide screen include a get-off guide screen 74, which will be described later with reference to FIG. 11.

Note that in this example, in step S22, the get-off guide information is transmitted to prompt the user M to get off the vehicle, but the present disclosure is not limited thereto. For example, during step S12, the get-off guide information may be transmitted to prompt the user M to get off, and when it is detected that the door of vehicle 10 is opened, the operation may proceed to step S13.

Next, in FIG. 8, the vehicle 10 detects whether the door of the vehicle 10 is opened (step S24). The door opening here may be opening of the door of the vehicle 10, and may also include opening and then closing of the door of the vehicle 10. Opening and closing of the door of the vehicle 10 is performed by, for example, an operation of the user M. In this case, the detection of the door opening is performed using a sensor or the like that detects the opening and closing of the door. The opening and closing of the door of the vehicle 10 may be automatically performed using an actuator provided in the vehicle 10. In this case, the opening of the door is detected by determining whether the door of the vehicle 10 is automatically opened or closed.

Next, the vehicle 10 transmits, to the information terminal 60, a display instruction for a reception screen for a movement control execution instruction (step S25).

The information terminal 60 displays the reception screen for a movement control execution instruction on the terminal screen 71, and receives the movement control execution instruction from the user M (step S26). Examples of a screen for receiving a movement control execution instruction include a reception screen 75, which will be described later with reference to FIG. 12.

Next, the information terminal 60 transmits the movement control execution instruction to the vehicle 10 according to the operation of the user M on the reception screen 75 (step S27). For example, the information terminal 60 transmits the movement control execution instruction that instructs movement of the vehicle 10 when receiving a specific operation (rotation swipe operation) on the reception screen 75, and transmits the movement control execution instruction that instructs stop of the vehicle 10 when the rotation swipe operation on the reception screen 75 is stopped.

The vehicle 10 starts the movement control (remote parking) according to the movement control execution instruction transmitted from the information terminal 60 (step S28). When the movement control is completed (step S29), the vehicle 10 turns off the ignition (stops the activation) (step S30).

In this way, when the information terminal 60 responds that remote parking will be continued without updating the software with respect to the update acceptance or unacceptance inquiry information inquiring whether to update the software, the vehicle 10 executes the remote parking according to the movement control execution instruction from the information terminal 60, and does not perform software update during the remote parking of the vehicle 10 of this time.

Note that if there is no response from the user regarding whether to update in step S20 within, for example, 10 minutes (a predetermined period) with respect to the update acceptance or unacceptance inquiry information in step S19 described above, the vehicle 10 may temporarily suspend receiving the remote parking and execute software update. In addition, for example, if the above-mentioned remote parking of the vehicle 10 is executed for a plurality of times, and the user repeats the response of not updating the software for a plurality of times (for a predetermined period) in step S20 to the update acceptance or unacceptance inquiry information in step S19, the vehicle 10 may temporarily suspend receiving the remote parking and execute software update.

Figure 9:
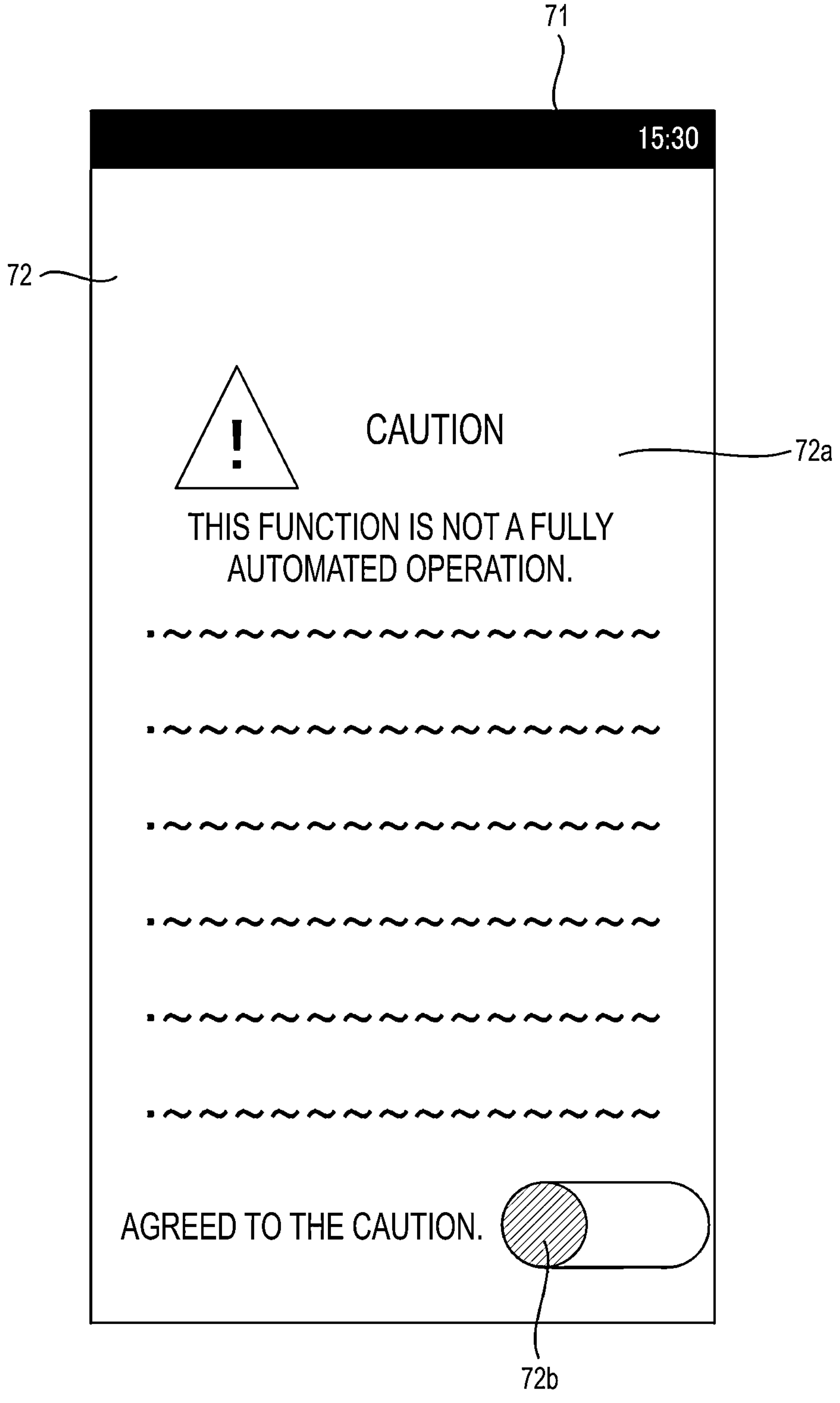
FIG. 9 is a diagram showing an example of a disclaimer screen 72 displayed on the information terminal 60.

FIG. 9 is a diagram showing an example of the disclaimer screen 72 displayed on the information terminal 60. The disclaimer screen 72 is displayed on the terminal screen 71 of the information terminal 60 that receives the inquiry information of the disclaimer regarding, for example, the remote parking. The disclaimer screen 72 is displayed, for example, in step S15 of FIG. 7.

As shown in FIG. 9, the disclaimer screen 72 includes an agreement sentence 72*a* indicating an agreement content such as "Caution: This function is not a fully automated operation." The disclaimer screen 72 also includes an agreement button 72*b* for the user M to operate when agreeing to the caution. Furthermore, the disclaimer screen 72 includes a sentence such as "Agreed to the caution" indicating that the caution is agreed to, which is displayed when the agreement button 72*b* is swiped (specific operation).

Figure 10:
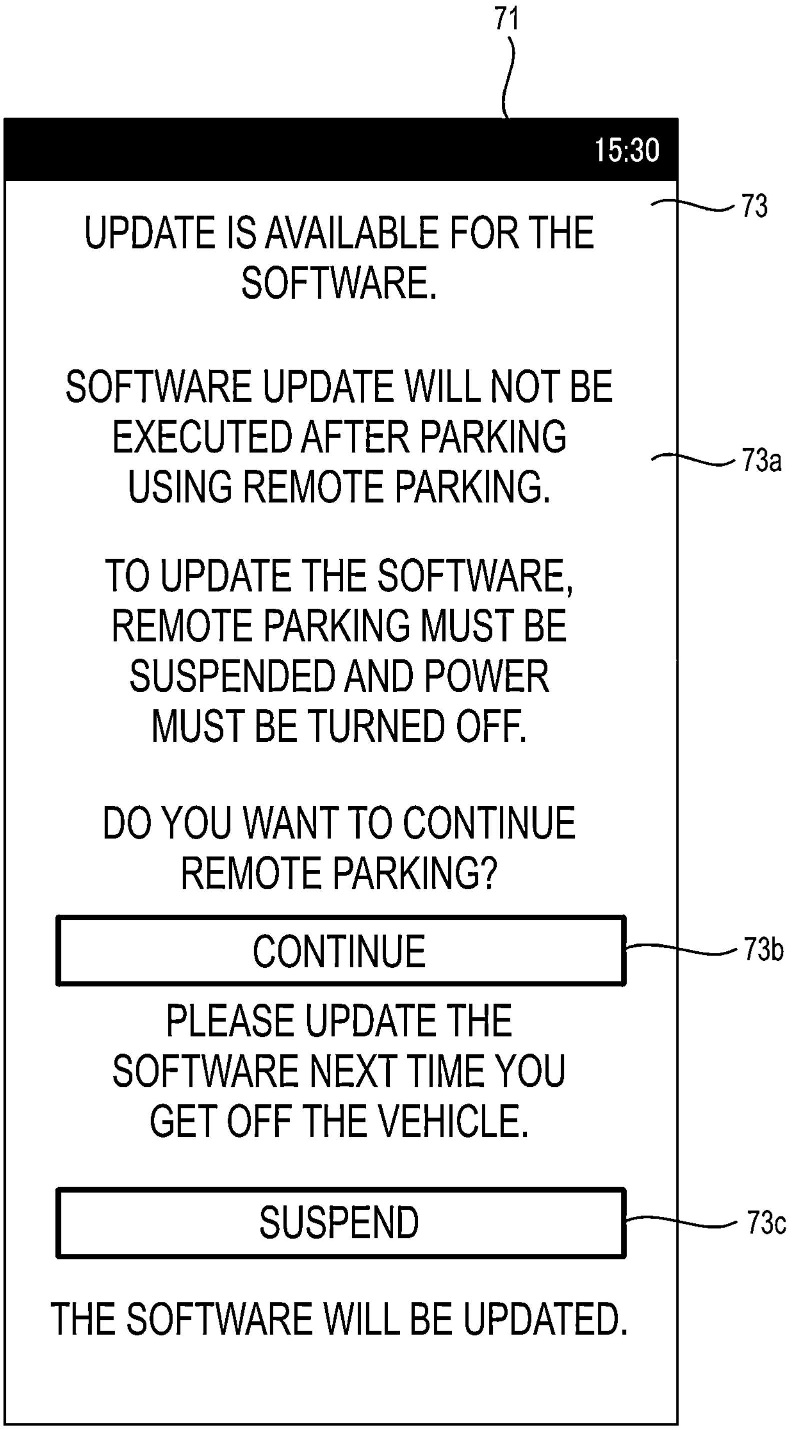
FIG. 10 is a diagram showing an example of an update acceptance or unacceptance reception screen 73 displayed on the information terminal 60.

FIG. 10 is a diagram showing an example of the update acceptance or unacceptance reception screen 73 displayed on the information terminal 60. The update acceptance or unacceptance reception screen 73 is displayed on the terminal screen 71 of the information terminal 60 that receives the inquiry information regarding acceptance or unacceptance of the software update, for example. The update acceptance or unacceptance reception screen 73 is displayed, for example, in step S20 of FIG. 7.

As shown in FIG. 10, the update acceptance or unacceptance reception screen 73 includes an update sentence 73*a* that indicates update requirements, such as "Update is available for the software. Software update will not be executed after parking using remote parking. To update the software, remote parking must be suspended and power must be turned off." The update acceptance or unacceptance reception screen 73 also includes an inquiry sentence such as "Do you want to continue remote parking?", a continue button 73*b* for the user M to operate when continuing remote parking, and a sentence that indicates processing to be followed after continuing remote parking such as "Please update the software next time you get off the vehicle." the update acceptance or unacceptance reception screen 73 includes a suspension button 73*c* for the user M to operate when suspending the remote parking, and a sentence that indicates processing to be followed after suspending the remote parking such as "Software update will be performed". The notification by the update acceptance or unacceptance reception screen 73 is an example of the "first notification" in the present disclosure.

Figure 11:
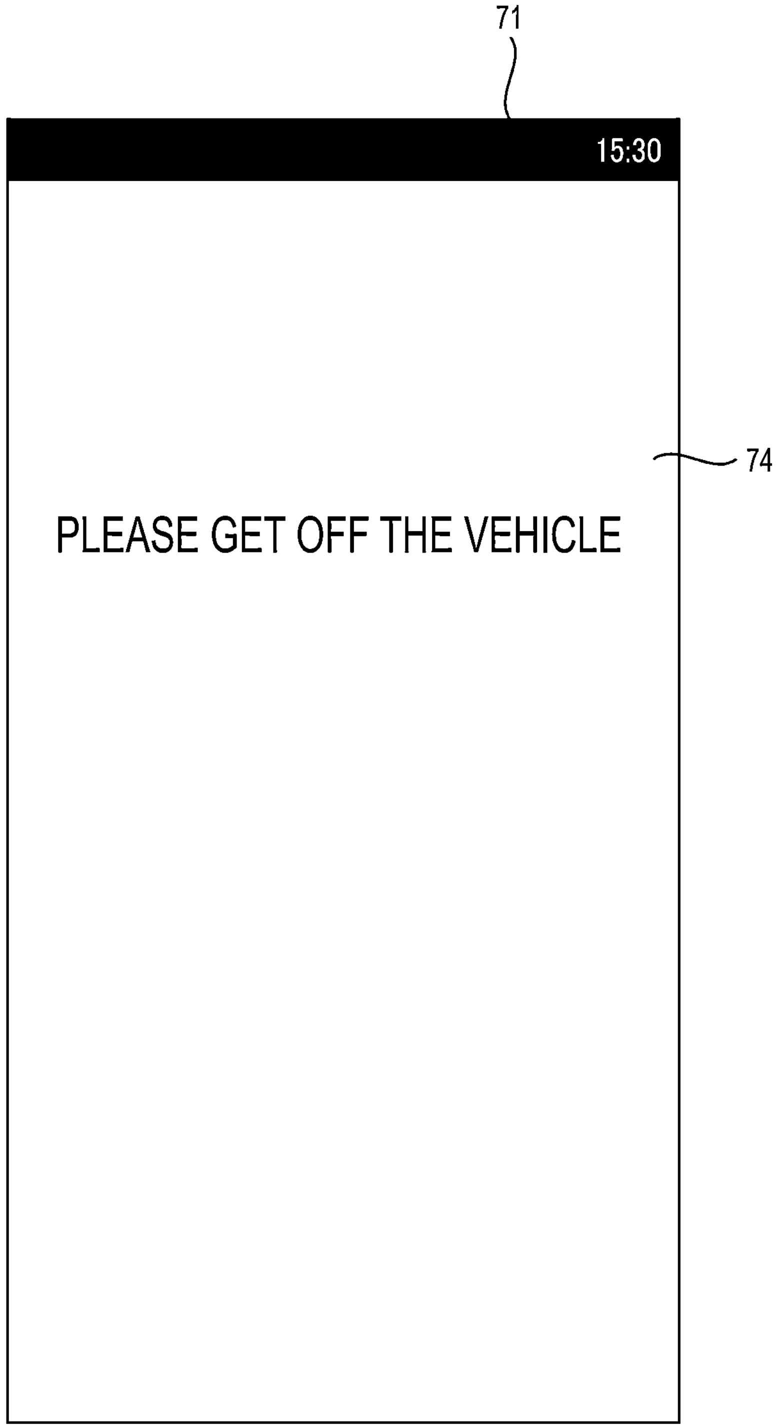
FIG. 11 is a diagram showing an example of a get-off guide screen 74 displayed on the information terminal 60.

FIG. 11 is a diagram showing an example of the get-off guide screen 74 displayed on the information terminal 60. The get-off guide screen 74 is displayed on the terminal screen 71 of the information terminal 60 that receives the get-off guide information prompting get-off from the vehicle 10, for example. The get-off guide screen 74 is displayed, for example, in step S23 of FIG. 7.

As shown in FIG. 11, the get-off guide screen 74 includes a message urging to get off, such as "Please get off the vehicle."

Figure 12:
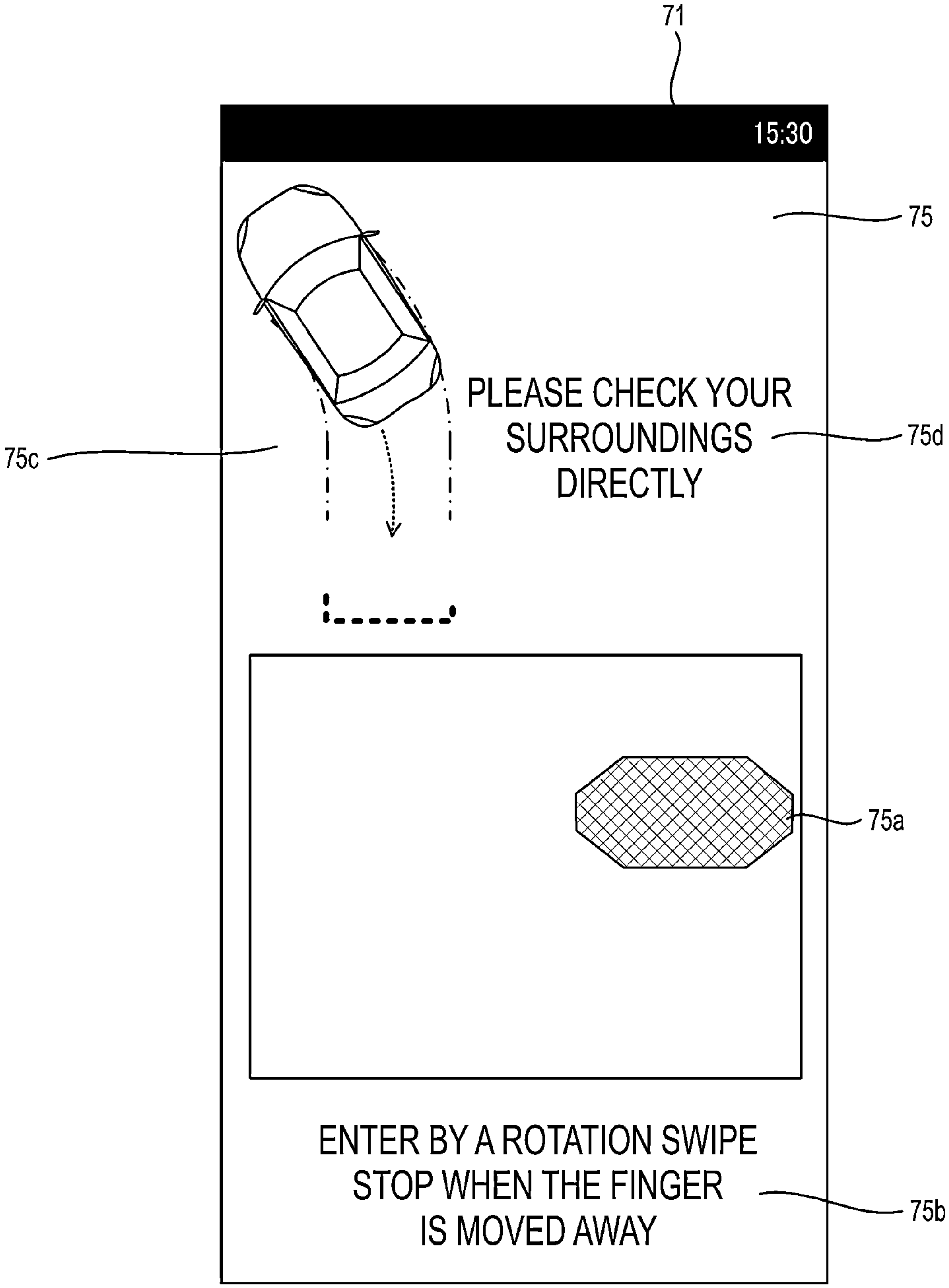
FIG. 12 is a diagram showing an example of a reception screen 75 displayed on the information terminal 60.

FIG. 12 is a diagram showing an example of the reception screen 75 displayed on the information terminal 60. The reception screen 75 is displayed on the terminal screen 71 of the information terminal 60 that receives an instruction to display a reception screen for receiving the movement control execution instruction, for example. The reception screen 75 is displayed, for example, in step S26 of FIG. 8.

As shown in FIG. 12, the reception screen 75 includes a moving icon 75*a* that moves following a touch position in a rotation swipe operation by the user M, for example. The reception screen 75 further includes a guide message 75*b* for executing remote parking of the vehicle 10 or temporarily suspending the remote parking of the vehicle 10, such as "Enter by a rotation swipe" or "Stop when the finger is moved away". The moving icon 75*a* and the guide message 75*b* constitute an example of a notification (introduction image) that prompts the user M to give a movement control execution instruction. The reception screen 75 includes an execution state image 75*c* indicating an execution state (a state of movement of the vehicle) of the parking control for the vehicle 10 above an area in which the moving icon 75*a* is displayed. Furthermore, the reception screen 75 includes a warning message 75*d*, such as "Please check your surroundings directly", on, for example, a right side of the execution state image 75*c* to alert the user M who gives the instruction operation. For example, the information terminal 60 transmits a movement control execution instruction that instructs movement of the vehicle 10 when receiving a rotation swipe operation of the moving icon 75*a*, and transmits a movement control execution instruction that instructs stop of the vehicle 10 when the rotation swipe operation of the moving icon 75*a* is stopped.

Second Operation Example

Figure 13:
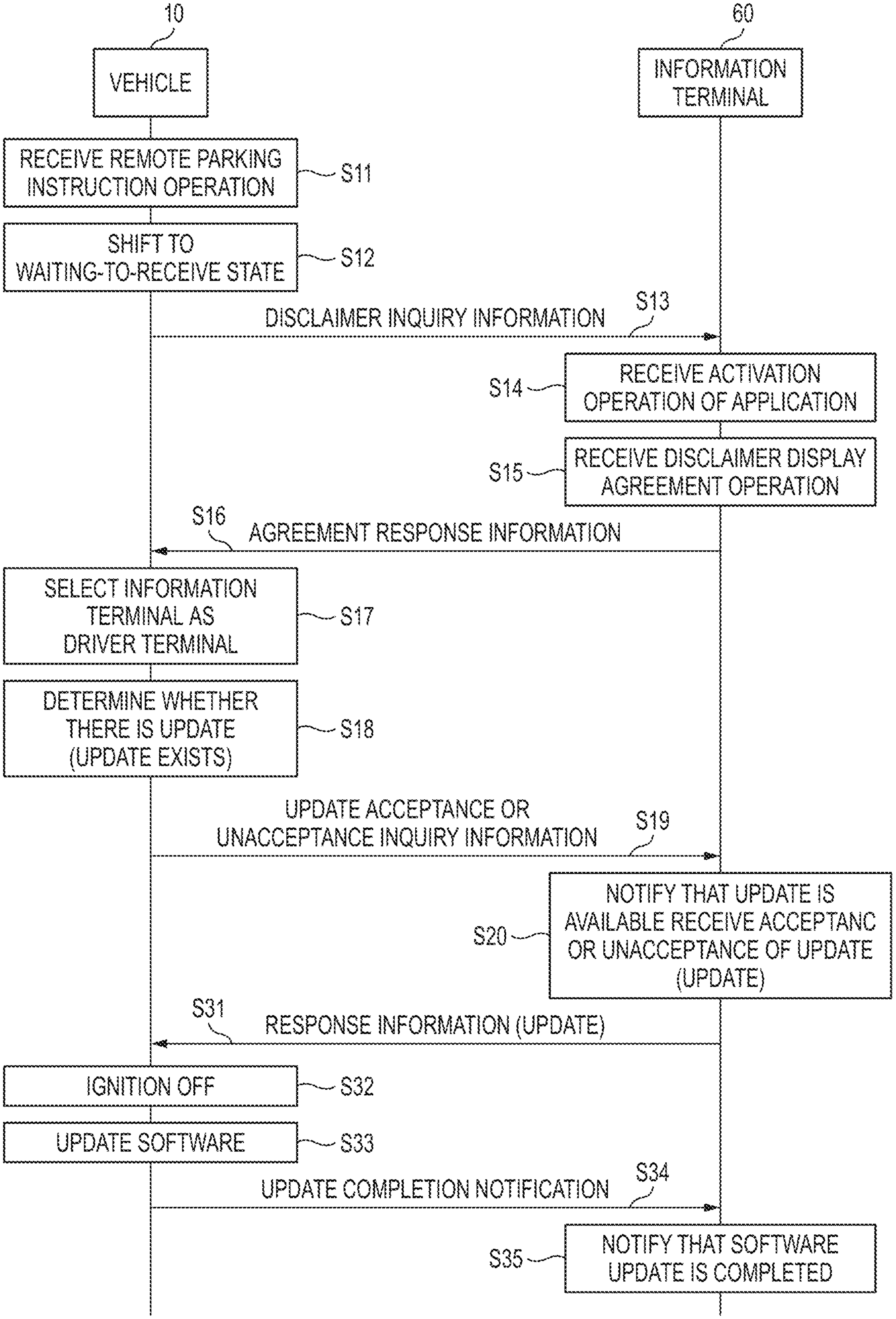
FIG. 13 is a sequence diagram showing a second operation example of the vehicle 10 and the information terminal 60.

FIG. 13 is a sequence diagram showing a second operation example of the vehicle 10 and the information terminal 60. As shown in FIG. 13, each kind of processing from step S11 to step S20 is the same as that from step S11 to step S20 in the first operation example described with reference to FIG. 7.

In the second operation example, description will be given on an assumption that in step S20, the response of the user M to the software update is to suspend the remote parking and "perform the update" of the software. The screen for receiving acceptance or unacceptance of update is the same as the update acceptance or unacceptance reception screen 73 shown in FIG. 10.

Next, the information terminal 60 transmits to the vehicle 10 the update response information of the user M who decides to perform the software update, which is received in step S20 (step S31).

Next, the vehicle 10 turns off the ignition of the vehicle 10 (stops the activation) (step S32), and then updates the software (step S33). When the vehicle 10 completes the software update, the vehicle 10 transmits an update completion notification notifying that the update is completed to the information terminal 60 (step S34).

When receiving the update completion notification from the vehicle 10, the information terminal 60 displays an update completion screen indicating the same on the terminal screen 71, and notifies the user M that the software update is completed (step S35). Examples of the screen indicating that the software update is completed include an update completion screen 76, which will be described later with reference to FIG. 14.

In this way, when the information terminal 60 responds that the remote parking is to be suspended and the software is to be updated with respect to the update acceptance or unacceptance inquiry information inquiring whether to update the software, the vehicle 10 turns off the ignition and updates the software.

Note that if there is no response from the user regarding whether to update in step S20 within, for example, 10 minutes (a predetermined period) with respect to the update acceptance or unacceptance inquiry information in step S19 described above, the vehicle 10 may temporarily suspend receiving the remote parking and execute software update.

Figure 14:
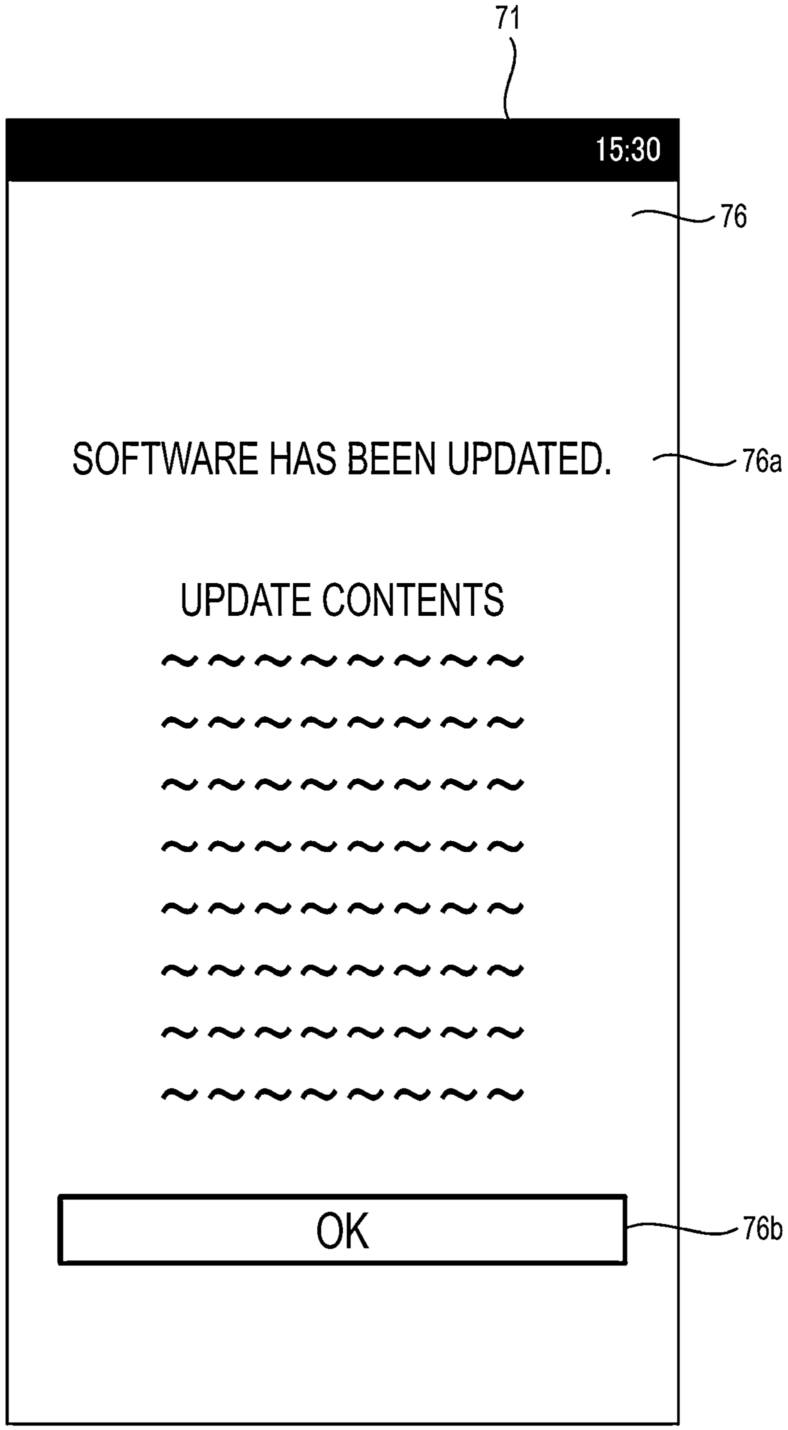
FIG. 14 is a diagram showing an example of an update completion screen 76 displayed on the information terminal 60.

FIG. 14 is a diagram showing an example of the update completion screen 76 displayed on the information terminal 60. The update completion screen 76 is displayed, for example, on the terminal screen 71 of the information terminal 60 that receives the notification notifying that the software update is completed. The update completion screen 76 is displayed, for example, in step S35 of FIG. 13.

As shown in FIG. 14, the update completion screen 76 includes an update sentence 76*a* indicating that the update is completed and the contents of the update, such as "Software update completed. Update contents: . . . ". The update completion screen 76 also includes an OK button 76*b* to be operated by the user M after confirming the update contents.

According to the first operation example and the second operation example described above, after determining the information terminal 60 that is allowed to give an instruction of remote parking, the vehicle 10 may notify the user M that the update is available for the software by suspending the remote parking of the vehicle 10 and powering off the vehicle 10, by displaying the update acceptance or unacceptance reception screen 73 on the information terminal 60. In this way, the vehicle 10 may notify the genuine user M of existence of update software related to remote parking at an appropriate timing when such update exists.

Third Operation Example

Figure 15:
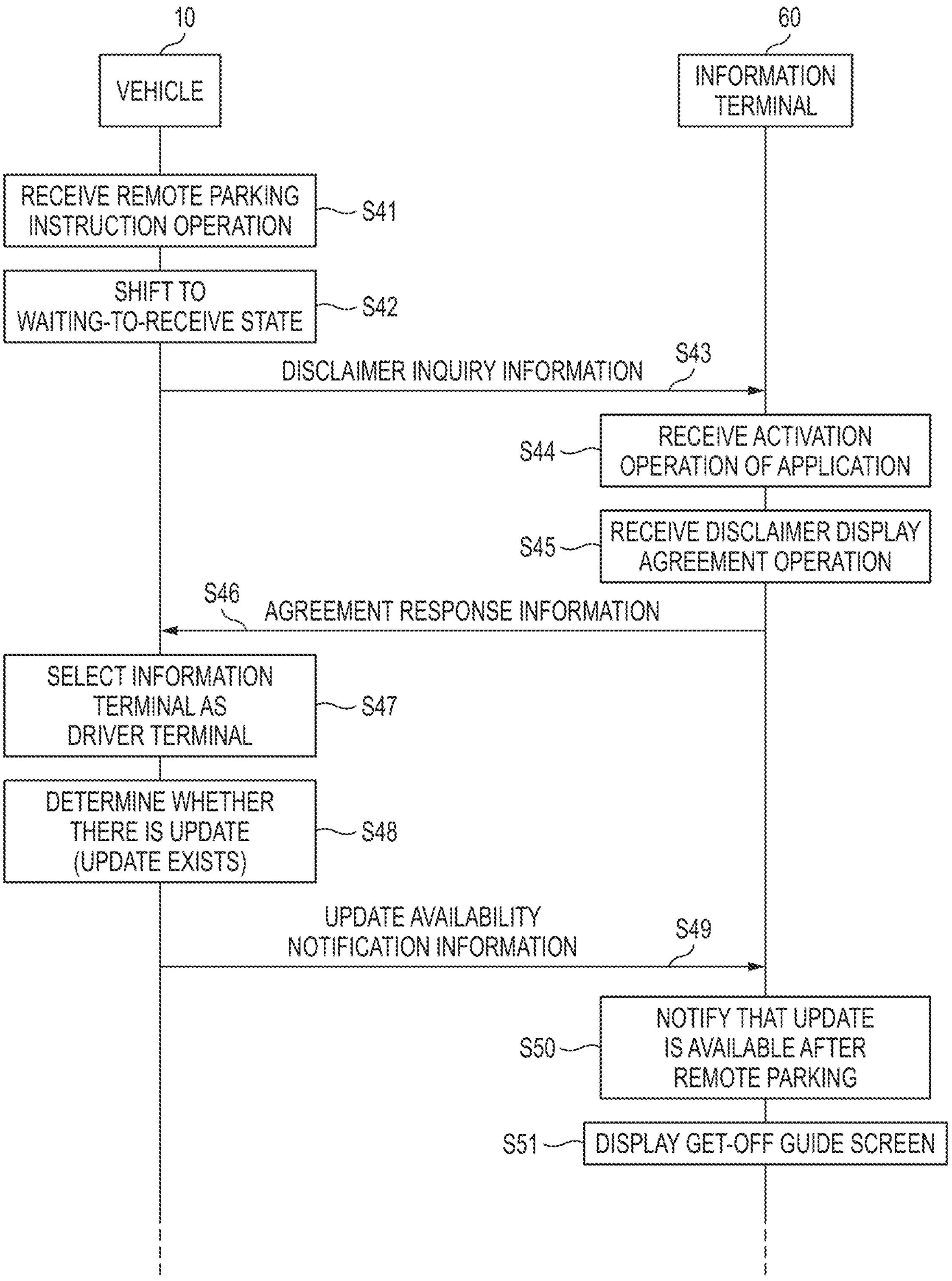
FIG. 15 is a sequence diagram (part 1) showing a third operation example of the vehicle 10 and the information terminal 60.
Figure 16:
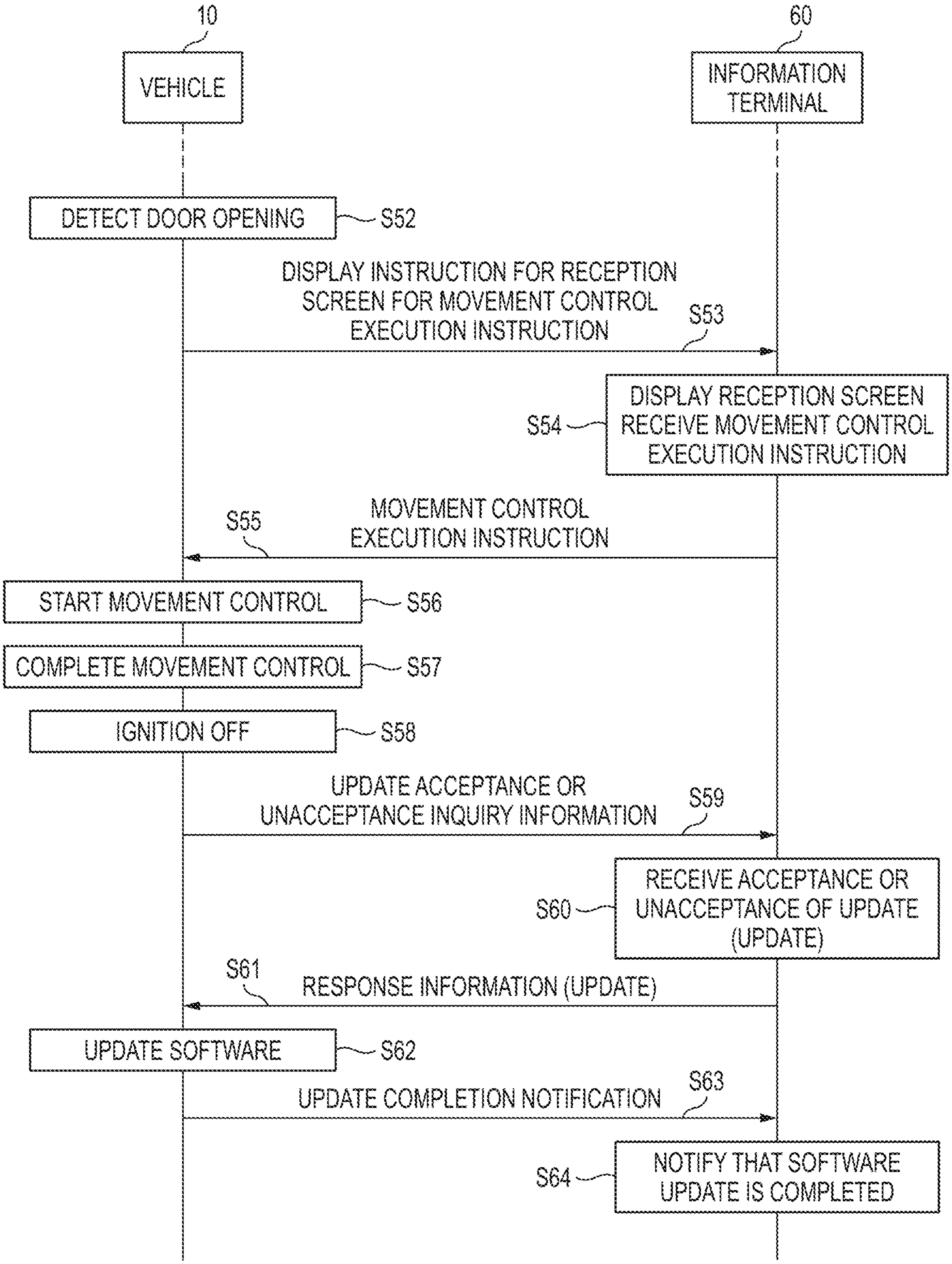
FIG. 16 is a sequence diagram (part 2) showing the third operation example of the vehicle 10 and the information terminal 60.

FIGS. 15 and 16 are sequence diagrams showing a third operation example of the vehicle 10 and the information terminal 60. As shown in FIG. 15, each kind of processing from step S41 to step S48 is the same as that from step S11 to step S18 in the first operation example described with reference to FIG. 7.

In the third operation example, if there is update available for the software in step S48, the vehicle 10 transmits update availability notification information notifying that update is available for the software to the information terminal 60 (step S49).

When receiving the update availability notification information from the vehicle 10, the information terminal 60 notifies the user M that the software may be updated after remote parking by displaying on the terminal screen 71 (step S50). Examples of the screen for notifying that update is available after remote parking include an update available notification screen 77, which will be described later with reference to FIG. 17.

After notifying that update is available after remote parking, the information terminal 60 displays a get-off guide screen for prompting the user M of the information terminal 60 to get off on the terminal screen 71 (step S51). The user M of the information terminal 60 opens the door of the vehicle 10, gets off, and closes the door of the vehicle 10 according to the get-off guide screen. The get-off guide screen is the same as the get-off guide screen 74 shown in FIG. 11 described above.

Note that in the present example, the get-off guide screen is displayed in step S51 to prompt the user M to get off the vehicle, but the present disclosure is not limited thereto. For example, during step S42, get-off guide information may be sent from the vehicle 10 to the information terminal 60 to prompt the user M to get off, and when it is detected that the door of the vehicle 10 is opened, the operation may proceed to step S43.

Next, in FIG. 16, each kind of processing from step S52 to step S58 is the same as that from step S24 to step S30 in the first operation example described with reference to FIG. 8.

In the third operation example, after the ignition is turned off in step S58, the vehicle 10 transmits update acceptance or unacceptance inquiry information inquiring whether to update the software to the information terminal 60 (step S59).

The information terminal 60 receives a response of acceptance or unacceptance of the update from the user M with respect to the inquiry regarding whether to update received from the vehicle 10 (step S60). Examples of the screen for receiving the response of acceptance or unacceptance of the software update include an update acceptance or unacceptance reception screen 78, which will be described later with reference to FIG. 18. Here, description will be given on an assumption that the user M responds to perform software update.

Next, the information terminal 60 transmits to the vehicle 10 the update response information of the user M who decides to perform the software update, which is received in step S60 (step S61).

When the vehicle 10 receives the update response information from the information terminal 60, the vehicle 10 updates the software (step S62). When the vehicle 10 completes the software update, the vehicle 10 transmits an update completion notification notifying that the update is completed to the information terminal 60 (step S63).

When receiving the update completion notification from the vehicle 10, the information terminal 60 displays an update completion screen indicating the same on the terminal screen 71, and notifies the user M that the software update is completed (step S64). The screen indicating that the software update is completed is the same as the update completion screen 76 shown in FIG. 14 described above.

In this way, the vehicle 10 notifies the user M in advance that update is available for the software after remote parking, performs an update acceptance or unacceptance inquiry to the user M to inquire whether to update the software when the remote parking is completed, and executes software update when the user M responds to update.

Note that if there is no response from the user regarding whether to update in step S60 within, for example, 10 minutes (a predetermined period) with respect to the update acceptance or unacceptance inquiry information in step S59 described above, the vehicle 10 may temporarily suspend receiving the remote parking and execute software update. Although step S60 is described on an assumption that the user M responds to update the software, for example, when the user M responds not to update the software, and then the remote parking of the vehicle 10 is executed for a plurality of times, and under this case, the user M repeats the response of not updating the software for a plurality of times, the vehicle 10 may temporarily suspend receiving the remote parking and execute software update.

Figure 17:
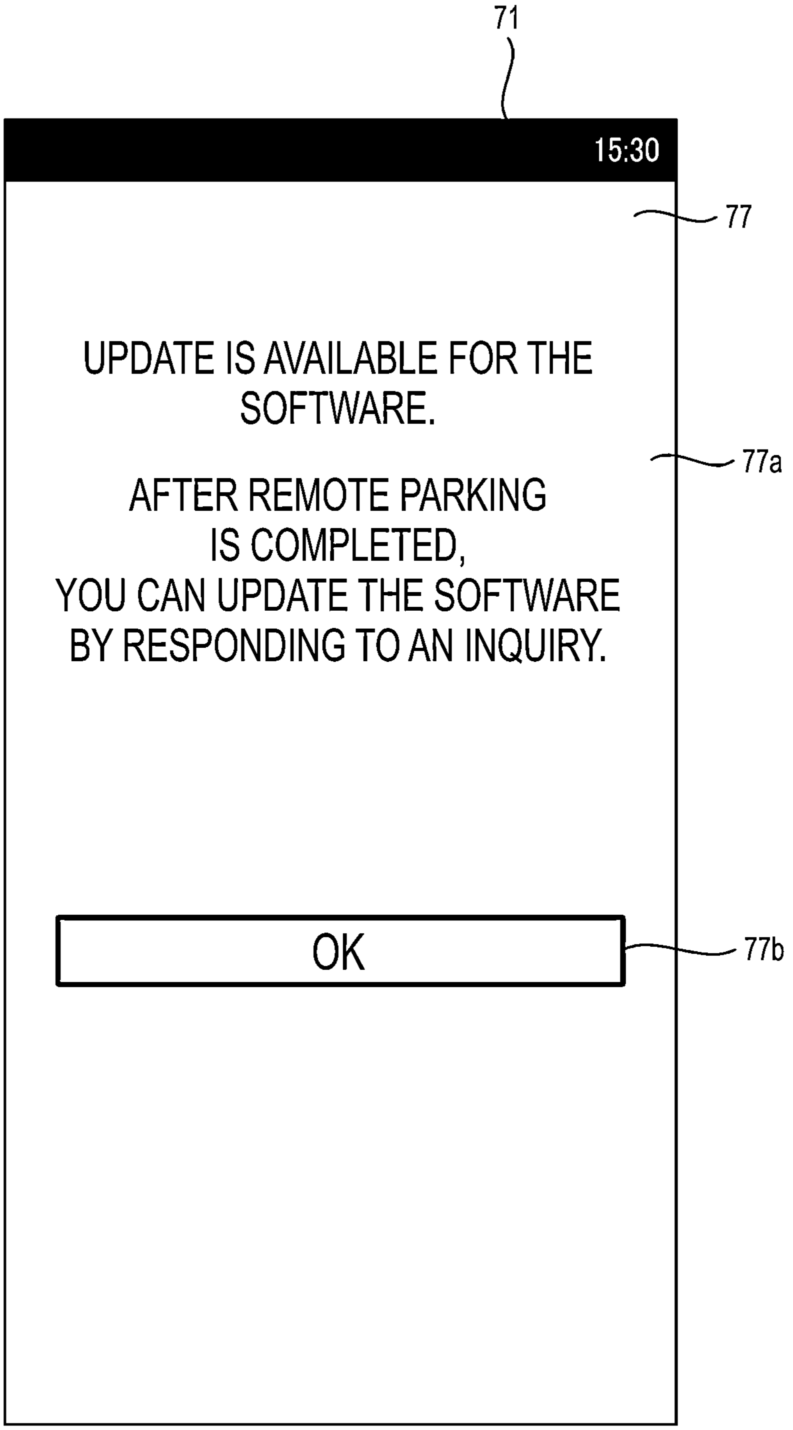
FIG. 17 is a diagram showing an example of an update available notification screen 77 displayed on the information terminal 60.

FIG. 17 is a diagram showing an example of the update available notification screen 77 displayed on the information terminal 60. The update available notification screen 77 is displayed on the terminal screen 71 of the information terminal 60 that receives the notification that update is available for the software after remote parking, for example. The update available notification screen 77 is displayed, for example, in step S50 of FIG. 15.

As shown in FIG. 17, the update available notification screen 77 includes an update sentence 77*a* indicating update requirements, such as "Update is available for the software. After remote parking is completed, you can update the software by responding to an inquiry." The update available notification screen 77 also includes an OK button 77*b* to be operated by the user M after confirming the update contents. The notification by the update available notification screen 77 is an example of the "first notification" in the present disclosure.

Figure 18:
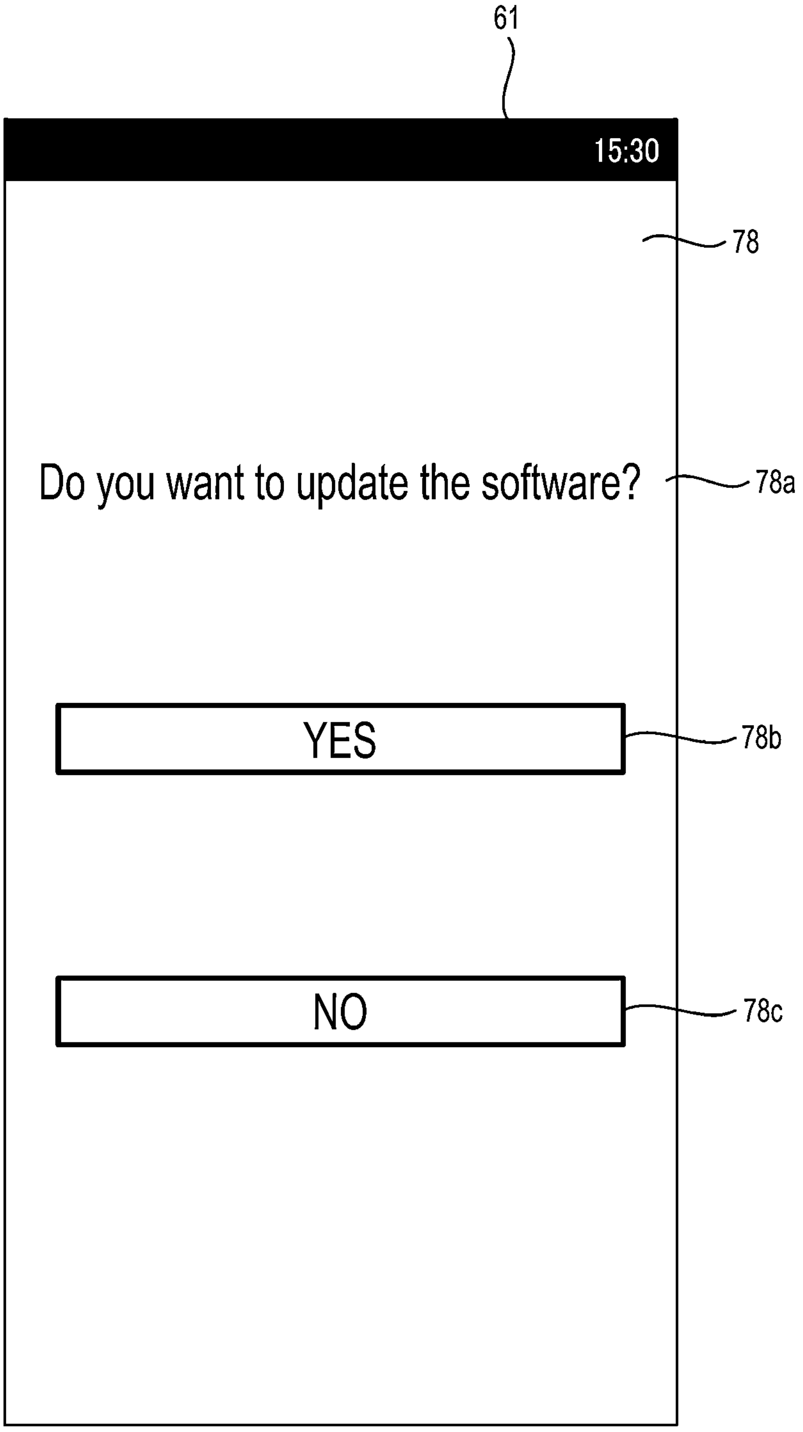
FIG. 18 is a diagram showing an example of an update acceptance or unacceptance reception screen 78 displayed on the information terminal 60.

FIG. 18 is a diagram showing an example of the update acceptance or unacceptance reception screen 78 displayed on the information terminal 60. The update acceptance or unacceptance reception screen 78 is displayed on the terminal screen 71 of the information terminal 60 that receives the inquiry information regarding acceptance or unacceptance of the software update, for example. The update acceptance or unacceptance reception screen 78 is displayed, for example, in step S60 of FIG. 16.

As shown in FIG. 18, the update acceptance or unacceptance reception screen 78 includes an update confirmation sentence 78*a*, which indicates confirmation of the update, such as "Do you want to update the software?". The update acceptance or unacceptance reception screen 78 also includes a "Yes" button 78*b* for the user M to operate when the user M wants to update, and a "No" button 78*c* for the user M to operate when the user M does not want to update. The notification by the update acceptance or unacceptance reception screen 78 is an example of the "second notification" in the present disclosure.

According to the third operation example described above, after determining the information terminal 60 that is allowed to give an instruction of remote parking, the vehicle 10 may notify the user M that the update is available for the software after the remote parking of the vehicle 10 is completed by displaying the update available notification screen 77 on the information terminal 60. In this way, the genuine user M may be notified that update is available for the software related to remote parking at an appropriate timing.

Fourth Operation Example

Figure 19:
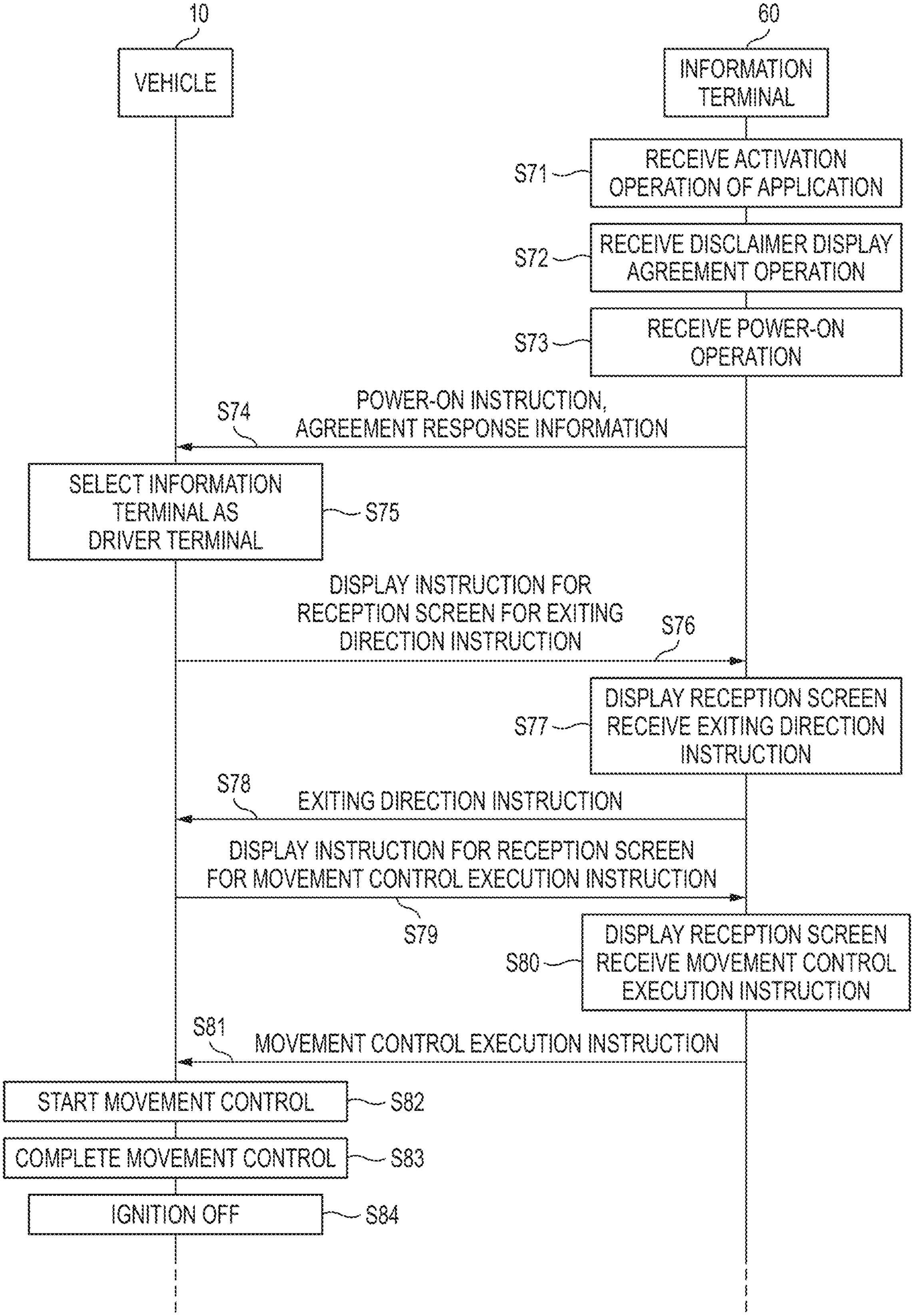
FIG. 19 is a sequence diagram (part 1) showing a fourth operation example of the vehicle 10 and the information terminal 60.
Figure 20:
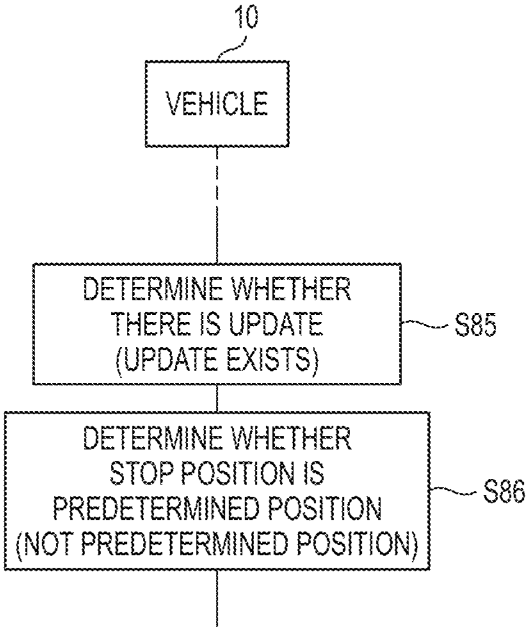
FIG. 20 is a sequence diagram (part 2) showing the fourth operation example of the vehicle 10 and the information terminal 60.

FIGS. 19 and 20 are sequence diagrams showing a fourth operation example of the vehicle 10 and the information terminal 60. The fourth operation example is an operation example of remote exiting of the vehicle 10.

First, as shown in FIG. 19, the information terminal 60 receives an activation operation from the user M who activates an application for executing a movement control execution instruction for the vehicle 10 (step S71). The information terminal 60 displays a disclaimer (cautions stipulated regarding remote exiting) on the terminal screen 71, and receives an agreement operation from the user M who agrees to the disclaimer (step S72). The screen of the disclaimer is the same as the disclaimer screen 72 shown in FIG. 9 described above.

Next, after receiving the disclaimer agreement operation of the user M, the information terminal 60 receives a power-on operation to start the vehicle 10 (step S73). Examples of a screen for receiving the power-on operation include a power start-up screen 79, which will be described later with reference to FIG. 21. The information terminal 60 transmits the power-on operation received in step S73 and the agreement response information of the disclaimer received in step S72 to the vehicle 10 (step S74).

The vehicle 10 selects the information terminal that sends the agreement response information first, in this example, the information terminal 60, as the driver terminal (step S75). Accordingly, the information terminal 60 is in a state of being communicably connected to the vehicle 10 as a driver terminal that may issue an instruction of the remote exiting of the vehicle 10. The vehicle 10 transmits, to the information terminal 60 selected as the driver terminal, a reception screen display instruction for receiving an instruction regarding an exiting direction of the vehicle 10 (step S76).

When receiving the reception screen display instruction from the vehicle 10, the information terminal 60 displays a reception screen for the exiting direction instruction on the terminal screen 71 and receives the instruction regarding the exiting direction from the user M (step S77). Examples of the screen for receiving the instruction regarding the exiting direction include an exit direction reception screen 80, which will be described later with reference to FIG. 22. The information terminal 60 transmits an instruction regarding the exiting direction to the vehicle 10 according to an operation of the user M on the exit direction reception screen 80 (step S78).

Next, the vehicle 10 transmits, to the information terminal 60, a display instruction for the reception screen for the movement control execution instruction (step S79).

When receiving the reception screen display instruction from the vehicle 10, the information terminal 60 displays the reception screen on the terminal screen 71 and receives the movement control execution instruction from the user M (step S80). The screen for receiving the movement control execution instruction is the same as the reception screen 75 shown in FIG. 12 described above.

Next, the information terminal 60 transmits the movement control execution instruction to the vehicle 10 according to the operation of the user M on the reception screen 75 (step S81).

The vehicle 10 starts the movement control (remote exiting) according to the movement control execution instruction transmitted from the information terminal 60 (step S82). When the movement control is completed (step S83), the vehicle 10 turns off the ignition (stops the activation) (step S84).

Next, in FIG. 20, the vehicle 10 determines whether there is software to be updated (step S85). Here, description will be given on an assumption that there is software to be updated. The vehicle 10 determines whether a current stop position of the vehicle 10 after the remote exiting, that is, a target position where the user M intends to cause the vehicle 10 to exit, is a predetermined position decided in advance (step S86). As described above, the predetermined position is, for example, a charging position to which the vehicle 10 is moved for charging the vehicle 10. Here, it is assumed that the stop position of the vehicle 10 is not the predetermined position. Since the stop position of the vehicle 10 is not the predetermined position, the vehicle 10 ends the processing without updating the software during the movement control (remote exiting) of the vehicle 10 at this time.

In this way, when remote exiting of the vehicle 10 is performed, the vehicle 10 determines whether the position from which the vehicle 10 is caused to exit is a predetermined position such as a position where the vehicle 10 is charged, and if it is not the predetermined position, it is determined that the remote exiting of the vehicle 10 is remote exiting for a purpose of getting on the vehicle 10 and traveling, and software update is not performed.

Figure 21:
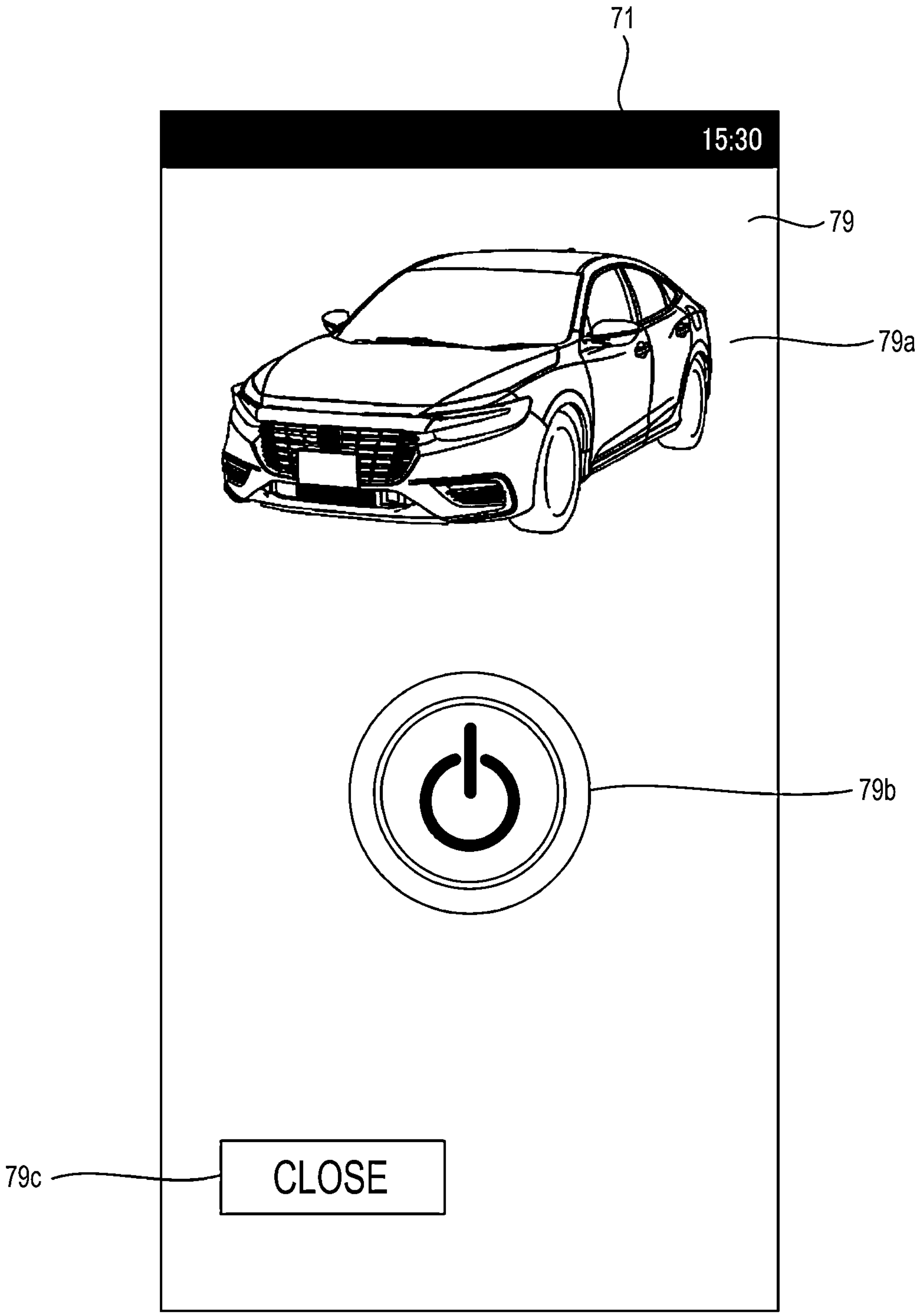
FIG. 21 is a diagram showing an example of a power start-up screen 79 displayed on the information terminal 60.

FIG. 21 is a diagram showing an example of the power start-up screen 79 displayed on the information terminal 60. The power start-up screen 79 is displayed on the terminal screen 71 of the information terminal 60 on which the disclaimer agreement operation is performed by the user M during, for example, remote exiting. The power start-up screen 79 is displayed, for example, in step S73 of FIG. 19.

As shown in FIG. 21, the power start-up screen 79 includes, for example, a vehicle image 79*a* of the vehicle 10 and a power start-up button 79*b* for making the remote exiting proceed. The power start-up screen 79 also includes a close button 79*c* for closing the power start-up screen 79 when the remote exiting is canceled.

Figure 22:
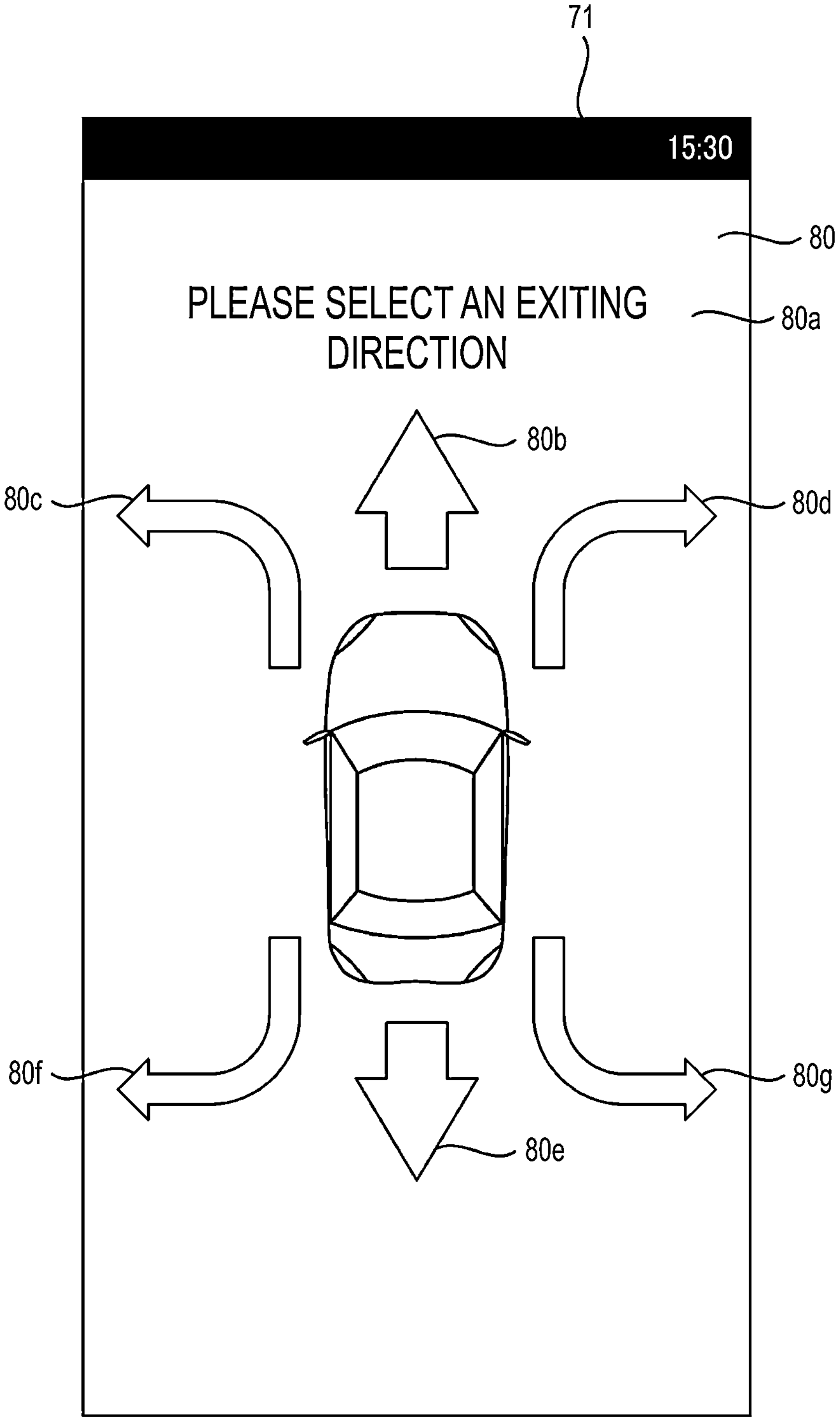
FIG. 22 is a diagram showing an example of an exit direction reception screen 80 displayed on the information terminal 60.

FIG. 22 is a diagram showing an example of the exit direction reception screen 80 displayed on the information terminal 60. The exit direction reception screen 80 is displayed, for example, on the terminal screen 71 of the information terminal 60 that receives the reception screen display instruction for the instruction regarding the exiting direction. The exit direction reception screen 80 is displayed, for example, in step S77 of FIG. 19.

As shown in FIG. 22, the exit direction reception screen 80 includes a guide message 80*a* that prompts the user to select an exiting direction, such as "Please select an exiting direction". The exit direction reception screen 80 includes, for example, forward exit 80*b*, in which the vehicle moves forward to exit the parking space and then stops, forward and left turn exit 80*c*, in which the vehicle moves forward and turns left to exit the parking space and then stops, forward right turn exit 80*d*, in which the vehicle moves forward and turns right to exit the parking space and then stops, rearward exit 80*e*, in which the vehicle moves rearward to exit the parking space and then stops, rearward left turn exit 80*f*, in which the vehicle moves rearward and turns left to exit the parking space and then stops, and rearward right turn exit 80*g*, in which the vehicle moves rearward and turns right to exit the parking space and then stops. On this exit direction reception screen 80, the user M selects the exiting direction (80*b* to 80*g*) in which the user wants the vehicle 10 to exit by a touch operation.

Fifth Operation Example

Figure 23:
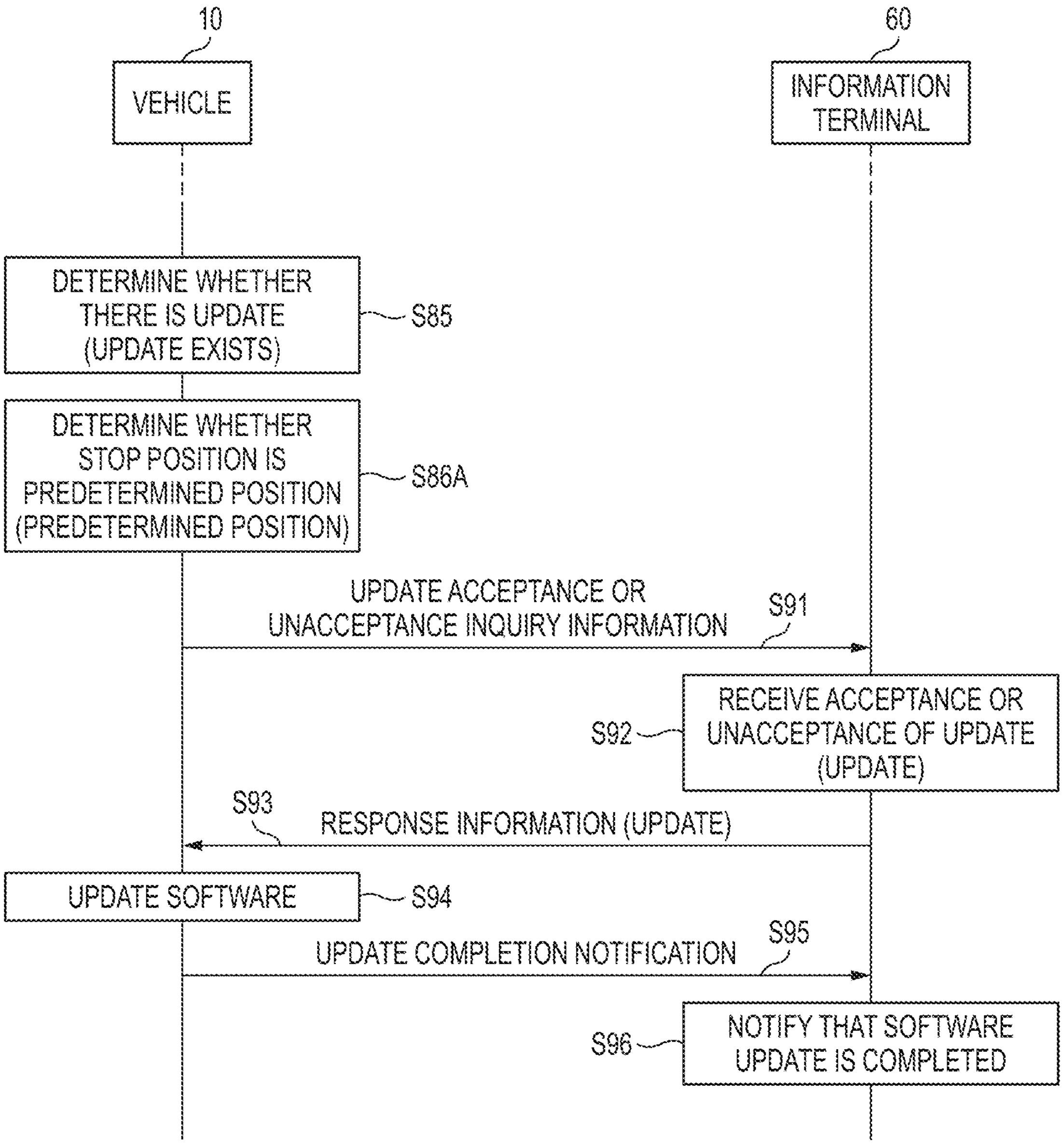
FIG. 23 is a sequence diagram showing a fifth operation example of the vehicle 10 and the information terminal 60.

FIG. 23 is a sequence diagram showing a fifth operation example of the vehicle 10 and the information terminal 60. The fifth operation example is an operation example in which the stop position of the vehicle 10, which is remotely caused to exit in the above-described fourth operation example, is a predetermined position decided in advance.

First, in the case of the fifth operation example, similarly to step S71 to step S86 of the fourth operation example described with reference to FIGS. 19 and 20, after the remote exiting of the vehicle 10 is completed and the ignition is turned off, it is determined whether the current stop position of the vehicle 10 is a predetermined position.

Next, in FIG. 23, in the case of the fifth operation example, it is assumed that the stop position determined in step S86A is a predetermined position, for example, a charging position for charging the vehicle 10. In this case, the vehicle 10 transmits to the information terminal 60 update acceptance or unacceptance inquiry information inquiring whether to update the software (step S91).

The information terminal 60 receives a response of acceptance or unacceptance of the update from the user M with respect to the inquiry regarding whether to update received from the vehicle 10 (step S92). The screen for receiving acceptance or unacceptance of the software update is the same as the update acceptance or unacceptance reception screen 78 shown in FIG. 18. The notification by the update acceptance or unacceptance reception screen 78 in the fifth operation example is an example of the "third notification" in the present disclosure. Here, description will be given on an assumption that the user M responds to perform software update.

Next, the information terminal 60 transmits to the vehicle 10 the update response information of the user M who decides to perform the software update, which is received in step S92 (step S93).

When the vehicle 10 receives the update response information from the information terminal 60, the vehicle 10 updates the software (step S94). When the vehicle 10 completes the software update, the vehicle 10 transmits an update completion notification notifying that the update is completed to the information terminal 60 (step S95).

When receiving the update completion notification from the vehicle 10, the information terminal 60 displays an update completion screen indicating the same on the terminal screen 71, and notifies the user M that the software update is completed (step S96). The screen indicating that the software update is completed is the same as the update completion screen 76 shown in FIG. 14 described above.

In this way, when the stop position of the vehicle 10 that is remotely caused to exit is, for example, a charging position (predetermined position) for charging the vehicle 10, the vehicle 10 will not start traveling until the charging is completed, so that the vehicle 10 inquires the information terminal 60 (driver terminal) as to whether to perform the software update, and if the driver responds to perform the update, the software update is executed. In this way, the genuine user M may be notified that update is available for the software related to remote parking at an appropriate timing.

Sixth Operation Example

Figure 24:
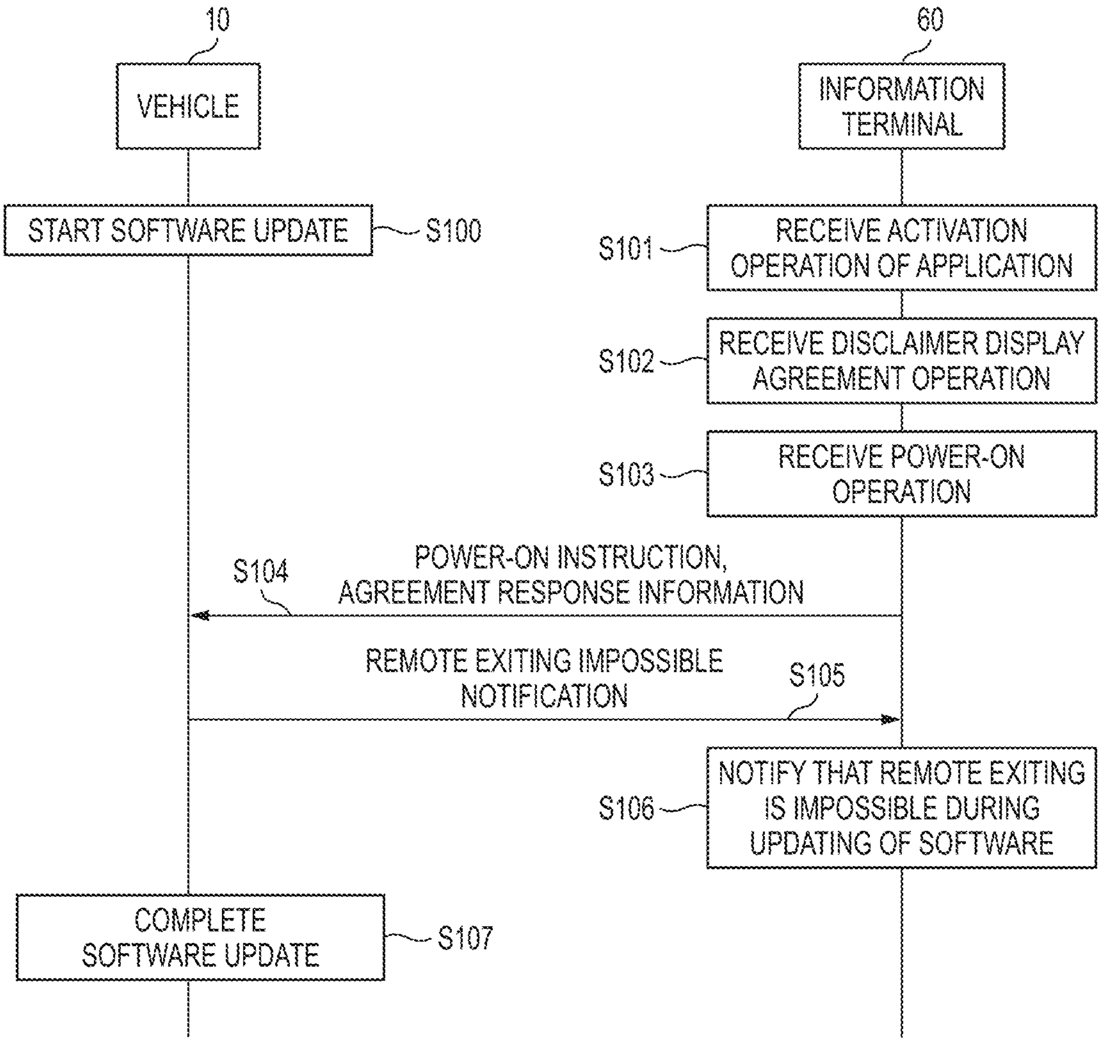
FIG. 24 is a sequence diagram showing a sixth operation example of the vehicle 10 and the information terminal 60.

FIG. 24 is a sequence diagram showing a sixth operation example of the vehicle 10 and the information terminal 60. The sixth operation example is an operation example in which the vehicle 10 is undergoing software update when an instruction of remote exiting of the vehicle 10 is received from the information terminal 60 in the above-described fourth operation example.

First, the vehicle 10 starts updating the software for which update is available (step S100).

The information terminal 60 starts preparation processing for performing remote exiting. Each kind of processing from step S101 to step S104 in the preparation processing of remote exiting is the same as that from step S71 to step S74 in the fourth operation example described with reference to FIG. 19.

When receiving a power-on operation and agreement response information from the information terminal 60, the vehicle 10 sends a remote exiting impossible notification to the information terminal 60 notifying that remote exiting of the vehicle 10 cannot be performed because the software is currently being updated (step S105).

Next, the information terminal 60 notifies the user M that remote exiting is impossible because the software is being updated by displaying the message on the terminal screen 71 (step S106). Examples of a screen for notifying the user that remote exiting is impossible include a remote exiting impossible screen 81, which will be described later with reference to FIG. 25.

The software update of the vehicle 10 that started in step S100 is completed (step S107). Note that after the software update is completed, remote exiting is possible if the vehicle 10 transmits to the information terminal 60 a reception screen display instruction for receiving an instruction regarding the exiting direction of the vehicle 10, for example.

Figure 25:
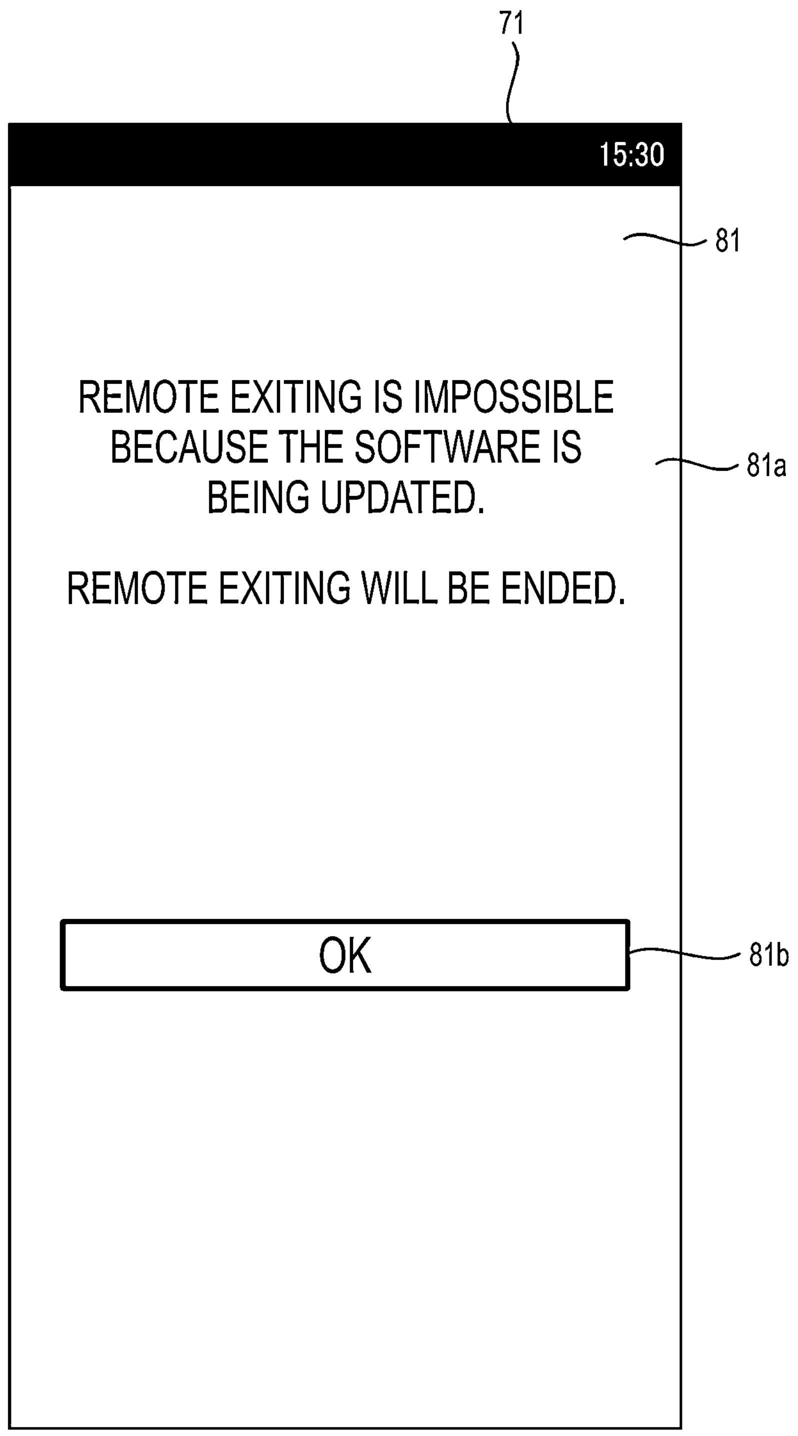
FIG. 25 is a diagram showing an example of a remote exiting impossible screen 81 displayed on the information terminal 60.

FIG. 25 is a diagram showing an example of the remote exiting impossible screen 81 displayed on the information terminal 60. The remote exiting impossible screen 81 is displayed, for example, on the terminal screen 71 of the information terminal 60 that receives the remote exiting impossible notification notifying that remote exiting is impossible. The remote exiting impossible screen 81 is displayed, for example, in step S106 of FIG. 24.

As shown in FIG. 25, the remote exiting impossible screen 81 includes an exiting impossible message 81*a* notifying that remote exiting is impossible, such as "Remote exiting is impossible because the software is being updated. Remote exiting will be ended." The remote exiting impossible screen 81 also includes an OK button 81*b* to be operated by the user M who confirms the end of remote exiting. The notification by the remote exiting impossible screen 81 is an example of the "fourth notification" in the present disclosure.

In this way, if the vehicle 10 receives an instruction of remote exiting from the information terminal 60 during the software update, the vehicle 10 may notify the user M that remote exiting of the vehicle 10 is impossible by displaying the remote exiting impossible screen 81 on the information terminal 60.

Note that the control method described in the embodiment described above may be implemented by executing a control program prepared in advance by a computer. The control program is stored in a computer-readable storage medium and executed by being read from the storage medium. In addition, the control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that may communicate with the control device, or may be provided in a server device that may communicate with the control device and the electronic device.

The embodiment of the present disclosure has been described above, but the present disclosure is not limited to the embodiment described above, and modifications, improvements, and the like may be made as appropriate.

In the above-described embodiment, an example in which the moving object is a vehicle (four-wheeled automobile) has been described, but the moving object is not limited thereto. For example, the moving object may be a vehicle such as a two-wheeled vehicle or a Segway. Further, the idea of the present disclosure is not limited to the vehicle, and may also be applied to a robot, a ship, an aircraft, or the like that includes a drive source and is movable by power of the drive source.

In the present specification, at least the following matters are described. Although corresponding constituent elements or the like in the embodiment described above are shown in parentheses, the present disclosure is not limited thereto.

(1) A control device (control ECU 20) for a moving object (vehicle 10), the control device including:

a control unit (calculation unit 52) capable of performing stop control to stop the moving object at a target position when a user of the moving object is not present in the moving object; and a storage unit (storage unit 54) in which software for movement control of the moving object is stored, in which in a case where the stop control is performed in a state in which update for the software is available, the control unit determines an instruction terminal that issues an instruction to perform the stop control, and then performs a first notification notifying the user that update for the software is available.

According to (1), in a state in which update is available for the software for performing movement control on the moving object, when stop control is executed to stop the moving object without a user at a target position, after determining the instruction terminal that instructs the stop control of the moving object, it is possible to notify the genuine user of the moving object that update is available for the software. In this way, it is possible to appropriately notify the user that update is available for the software related to the stop control of the moving object.

(2) The control device according to (1), in which in the case where the stop control is performed in a state in which update for the software is available, the control unit performs the first notification after determining the instruction terminal and before starting the stop control.

According to (2), by notifying the user after the instruction terminal is determined and before the stop control is started, the user may be more appropriately notified that update is available for the software.

(3) The control device according to (1) or (2), in which the control unit determines the instruction terminal based on an operation on an information terminal owned by the user.

According to (3), the instruction terminal that instructs the stop control of the moving object is determined by the user operating the information terminal, so that the user of the moving object may be more appropriately notified that update is available for the software.

(4) The control device according to any one of (1) to (3), in which the control unit performs the stop control based on a movement instruction from the instruction terminal.

As in (4), it is preferable that the stop control of the moving object is executed based on a movement instruction from the instruction terminal.

(5) The control device according to any one of (1) to (4), in which the control unit is configured to transmit inquiry information related to determination of the instruction terminal to an information terminal in a vicinity of the moving object, receive predetermined response information to the inquiry information, and determine an information terminal that sends the response information that is first received as the instruction terminal.

According to (5), the information terminal that first sends response information with respect to the inquiry information from the moving object is determined to be the instruction terminal, so that the user of the moving object may be more appropriately notified that update is available for the software.

(6) The control device according to any one of (1) to (5), in which the first notification is a notification that update for the software is available when the stop control is suspended and the moving object is powered off.

As in (6), in order to perform the software update, it is preferable to suspend the stop control of the moving object and power off the moving object, for example.

(7) The control device according to (6), in which the first notification is a notification for receiving an instruction to update the software, and the control unit executes update of the software when the instruction to update the software is received in response to the first notification.

As in (7), when executing the software update, it is preferable to receive an instruction from the user in response to the notification of requirements for updating the software.

(8) The control device according to any one of (1) to (5), in which the control unit performs a second notification when the stop control is completed and the moving object is powered off, and the first notification is a notification that update for the software is available in response to a response to the second notification.

As in (8), in order to perform the software update, it is preferable to require a user to respond to a notification that is performed, for example, when the stop control of the moving object is completed and the moving object is powered off.

(9) The control device according to (8), in which the second notification is a notification for receiving an instruction to update the software, and the control unit executes update of the software when the instruction to update the software is received in response to the second notification.

As in (9), when executing the software update, it is preferable to receive an instruction from the user with respect to a notification of the requirements for updating the software.

(10) The control device according to any one of (1) to (9), in which in a case where an instruction to update the software is not received for a predetermined period after a notification notifying that an instruction to update the software is to be received is performed, the control unit executes update of the software.

As in (10), when a notification notifying that an instruction for software update is to be received but no instruction is given from the user in response to the notification for a predetermined period, it is preferable to execute the software update.

(11) The control device according to any one of (1) to (10), in which the control unit is capable of performing movement control to move the moving object from a stop position to a target position, and in a case where the movement control is performed in a state in which update for the software is available, the control unit does not execute update of the software even when the movement control is completed and the moving object is powered off.

As in (11), when executing the movement control to move the moving object from a stop position to a target position, it is preferable not to execute the software update since it is predictable that the moving object will start moving after the movement control.

(12) The control device according to (11), in which in a case where update for the software is available and the target position is a predetermined position, the control unit performs a third notification notifying that update for the software is available when the movement control is completed and the moving object is powered off, and executes update of the software in response to a response to the third notification.

As in (12), when the moving object is moved from a stop position to a target position and the target position is a predetermined position, it is preferable to execute the software update since it is predictable that the moving object will not start moving after the movement control.

(13) The control device according to any one of (1) to (12), in which the control unit is capable of performing movement control to move the moving object from a stop position to a target position, and in a case where an instruction of the movement control is issued from an information terminal owned by the user during update of the software, the control unit does not perform the movement control and performs a fourth notification notifying that the movement control is impossible.

As in (13), when an instruction for movement control is given to move a moving object from a stop position to a target position while the software is being updated, it is preferable to notify that the movement control of the moving object is impossible.

(14) A control method using a control device for a moving object, the control device including a control unit capable of performing stop control to stop the moving object at a target position when a user of the moving object is not present in the moving object, and a storage unit in which software for movement control of the moving object is stored, in which in a case where the stop control is performed in a state in which update for the software is available, a processor of the control device determines an instruction terminal that issues an instruction to perform the stop control, and then performs a first notification notifying the user that update for the software is available.

According to (14), in a state in which update is available for the software for performing movement control on the moving object, when stop control is executed to stop the moving object without a user at a target position, after determining the instruction terminal that instructs the stop control of the moving object, it is possible to notify the genuine user of the moving object that update is available for the software. In this way, it is possible to appropriately notify the user that update is available for the software related to the stop control of the moving object.

(15) A non-transitory computer-readable storage medium storing a control program of a control device for a moving object, the control device including a control unit capable of performing stop control to stop the moving object at a target position when a user of the moving object is not present in the moving object, and a storage unit in which software for movement control of the moving object is stored, in which in a case where the stop control is performed in a state in which update for the software is available, the control program causes a processor of the control device to determine an instruction terminal that issues an instruction to perform the stop control, and then to perform a first notification notifying the user that update for the software is available.

According to (15), in a state in which update is available for the software for performing movement control on the moving object, when stop control is executed to stop the moving object without a user at a target position, after determining the instruction terminal that instructs the stop control of the moving object, it is possible to notify the genuine user of the moving object that update is available for the software. In this way, it is possible to appropriately notify the user that update is available for the software related to the stop control of the moving object.

What is claimed is:

1. A control device for a moving object, the control device comprising:

a memory configured to store software for movement control of the moving object; and a hardware processor configured to:

communicate with an information terminal of a user of the moving object;

perform stop control to stop the moving object at a target position when the user is not present in the moving object; and issue a notification regarding update for the software to an output device configured to output information to the user or the information terminal based on the communication, wherein in a case where the stop control is performed in a state in which update for the software is available, the hardware processor performs a first notification notifying the user that update for the software is available, the hardware processor determines whether to perform the stop control or the update for the software based on an operation of the user in response to the first notification, in a case where it is determined to perform the stop control, the hardware processor does not execute update for the software during the stop control, and in a case where it is determined to perform the update, the hardware processor stops the stop control and executes update for the software after activation of the moving object is stopped.

2. The control device according to claim 1, wherein in the case where the stop control is performed in a state in which update for the software is available, the hardware processor performs the first notification after determining an instruction terminal to issue an instruction to perform the stop control and before starting receiving a movement control execution instruction of the user in the stop control.

3. The control device according to claim 2, wherein the hardware processor is configured to transmit inquiry information related to determination of the instruction terminal to an information terminal in a vicinity of the moving object, receive predetermined response information to the inquiry information, and determine an information terminal that sends the response information that is first received as the instruction terminal.

4. The control device according to claim 2, wherein the hardware processor performs the stop control based on a movement instruction from the instruction terminal.

5. The control device according to claim 1, wherein the first notification is a notification that update for the software is available when the stop control is suspended and the moving object is powered off.

6. The control device according to claim 5, wherein the first notification is a notification for receiving an instruction to update the software, and the hardware processor executes update of the software when the instruction to update the software is received in response to the first notification.

7. The control device according to claim 1, wherein the hardware processor performs a second notification when the stop control is completed and the moving object is powered off, and the first notification is a notification that update for the software is available in response to a response to the second notification.

8. The control device according to claim 7, wherein the second notification is a notification for receiving an instruction to update the software, and the hardware processor executes update of the software when the instruction to update the software is received in response to the second notification.

9. The control device according to claim 1, wherein in a case where an instruction to update the software is not received for a predetermined period after a notification notifying that an instruction to update the software is to be received is performed, the hardware processor executes update of the software.

10. The control device according to claim 1, wherein the hardware processor is configured to perform movement control to move the moving object from a stop position to a target position, and in a case where an instruction of the movement control is issued from an information terminal owned by the user during update of the software, the hardware processor does not perform the movement control and performs a fourth notification notifying that the movement control is impossible.

11. The control device according to claim 1, wherein the stop control includes parking control to park the moving object in a target position and exit control to move the moving object from a parking position to an exit position, and, in a case where the exit control is performed in a state in which the update for the software is available, the hardware processor does not issue the first notification notifying the user that update for the software is available to the user in the exit control or does not execute update for the software.

12. The control device according to claim 11, wherein in a case where the exit control is performed in a state in which update for the software is available, the hardware processor does not execute update for the software even when the exit control is completed and the moving object is powered off.

13. The control device according to claim 12, wherein in a case where update for the software is available and the target position is a predetermined position, the hardware processor performs a third notification notifying that update for the software is available when the exit control is completed and the moving object is powered off, and executes update of the software in response to a response to the third notification.

14. A control method using a control device for a moving object, the control device including a hardware processor configured to stop control to stop the moving object at a target position when a user of the moving object is not present in the moving object, and a memory configured to store software for movement control of the moving object, the control method comprising:

communicating with an information terminal of a user of the moving object; and issuing a notification regarding update for the software to an output device configured to output information to the user or the information terminal based on the communication, wherein the issuing of the notification includes, in a case where the stop control is performed in a state in which update for the software is available, performing a first notification notifying the user that update for the software is available, and the method further comprises determining whether to perform the stop control or the update for the software based on an operation of the user in response to the first notification, in a case where it is determined to perform the stop control, not executing update for the software during the stop control, and in a case where it is determined to perform the update, stopping the stop control and executing update for the software after activation of the moving object is stopped.

15. A non-transitory computer-readable storage medium storing a control program of a control device for a moving object, the control device including a hardware processor configured to perform stop control to stop the moving object at a target position when a user of the moving object is not present in the moving object, and a memory configured to store software for movement control of the moving object, wherein the control program causing a computer to execute a control method comprising:

communicating with an information terminal of a user of the moving object; and issuing a notification regarding update for the software to an output device configured to output information to the user or the information terminal based on the communication, wherein the issuing of the notification includes, in a case where the stop control is performed in a state in which update for the software is available, performing a first notification notifying the user that update for the software is available; and the control method further comprises determining whether to perform the stop control or the update for the software based on an operation of the user in response to the first notification, in a case where it is determined to perform the stop control, not executing update for the software during the stop control, and in a case where it is determined to perform the update, stopping the stop control and executing update for the software after activation of the moving object is stopped.

16. A control device for a moving object, the control device comprising:

a memory configured to store software for movement control of the moving object; and a hardware processor configured to:

communicate with an information terminal of a user of the moving object;

perform exit control to cause the moving object to exit from a parking position and park control to park the moving object at a target position when the user is not present in the moving object; and issue a notification regarding update for the software to an output device configured to output information to the user or the information terminal based on the communication, wherein in a case where the parking control is performed in a state in which update for the software is available, the hardware processor performs a first notification notifying the user that update for the software is available, and in a case where the exit control is performed in a state in which the update for the software is available, the hardware processor does not issue the first notification in the exit control or does not execute update for the software.

17. The control device according to claim 16, wherein the hardware processor does not execute update of the software even when the exit control is completed and the moving object is powered off.

* * * * *